US011248172B2

(12) United States Patent
Malmqvist et al.

(10) Patent No.: US 11,248,172 B2
(45) Date of Patent: Feb. 15, 2022

(54) HEAT TREATMENT PROCESS AND SYSTEM FOR INCREASED PITCH YIELDS

(71) Applicant: Koppers Delaware, Inc., Pittsburgh, PA (US)

(72) Inventors: Michael Bech Malmqvist, Odense (DK); Billy Jay Cairns, Monaca, PA (US); Carl Camille Mueller, Gibsonia, PA (US); John Thomas Baron, Cranberry Township, PA (US); James T Dietz, Mars, PA (US)

(73) Assignee: Koppers Delaware, Inc., Pittsburgh, PA (US)

( * ) Notice: Subject to any disclaimer, the term of this patent is extended or adjusted under 35 U.S.C. 154(b) by 0 days.

(21) Appl. No.: 16/520,135

(22) Filed: Jul. 23, 2019

(65) Prior Publication Data

US 2021/0024830 A1  Jan. 28, 2021

(51) Int. Cl.
*B01D 3/06* (2006.01)
*C10C 1/16* (2006.01)
*B01D 3/14* (2006.01)

(52) U.S. Cl.
CPC ............... *C10C 1/16* (2013.01); *B01D 3/06* (2013.01); *B01D 3/143* (2013.01)

(58) Field of Classification Search
None
See application file for complete search history.

(56) References Cited

U.S. PATENT DOCUMENTS

| | | | |
|---|---|---|---|
| 2,768,119 A | 10/1956 | Nash | |
| 3,140,248 A | 7/1964 | Bell et al. | |
| 3,318,801 A | 5/1967 | Alexander et al. | |
| 3,673,077 A | 6/1972 | Roza | |
| 3,794,579 A | 2/1974 | Enomoto et al. | |
| 3,846,362 A | 11/1974 | Reincke et al. | |
| 4,013,540 A | 3/1977 | Moyle et al. | |

(Continued)

FOREIGN PATENT DOCUMENTS

| | | |
|---|---|---|
| CA | 1069846 | 1/1980 |
| DE | 3702720 C2 | 8/1988 |

(Continued)

OTHER PUBLICATIONS

Mirtchi, et al, Polycyclic Aromatic Hydrocarbons (PAH's) in Pitches Used in the Aluminum Industry, International Conference on Carbon, Granada, Spain, Jul. 4-8, 1994, 794-735.

(Continued)

*Primary Examiner* — Tam M Nguyen

(74) *Attorney, Agent, or Firm* — Metz Lewis Brodman Must O'Keefe LLC

(57) ABSTRACT

Pitch production systems utilizing coal tar or decant oil for coal or petroleum based pitch are disclosed. Total pitch production yields are increased by heat treating distillate fractions from the pitch production process. A heat treatment system and process are disclosed in embodiments. The heaviest distillates having the highest molecular weights are subjected to heat treatment, though other embodiments contemplate heat treating a variety of combined distillate fractions. The heat treatment systems require heat soaking the distillate(s) at elevated temperatures of 459-535° C. at a near-constant temperature with near-uniform flow. A fraction of the heat-treated distillate may be reintroduced to the pitch production system as part of a continuous process.

27 Claims, 14 Drawing Sheets

(56) References Cited

U.S. PATENT DOCUMENTS

| | | |
|---|---|---|
| 4,039,423 A | 8/1977 | Moyle et al. |
| 4,093,479 A | 6/1978 | Baird |
| 4,096,056 A | 6/1978 | Haywood et al. |
| 4,193,900 A | 3/1980 | Whittington et al. |
| 4,466,932 A | 8/1984 | Koyama et al. |
| 4,497,789 A | 2/1985 | Sawran et al. |
| 4,670,129 A | 6/1987 | Tate et al. |
| 4,671,864 A | 6/1987 | Sawran et al. |
| 4,705,618 A | 11/1987 | Tsuchitani et al. |
| 4,844,740 A | 7/1989 | Chiu |
| 4,892,642 A | 1/1990 | Romine et al. |
| 4,921,539 A | 5/1990 | Harlin et al. |
| 4,927,620 A | 5/1990 | Ward |
| 4,929,404 A | 5/1990 | Takahashi et al. |
| 4,931,162 A | 6/1990 | Romine |
| 4,961,837 A | 10/1990 | Velasco |
| 4,971,679 A | 11/1990 | Lewis et al. |
| 5,128,021 A | 7/1992 | Romey et al. |
| 5,182,011 A | 1/1993 | Tsuchitani et al. |
| 5,217,657 A | 6/1993 | Engle |
| 5,259,947 A | 11/1993 | Kalback et al. |
| 5,262,043 A | 11/1993 | Boenigk et al. |
| 5,334,414 A | 8/1994 | Edie et al. |
| 5,360,848 A | 11/1994 | Kuechler et al. |
| 5,413,738 A | 5/1995 | Lewis et al. |
| 5,429,739 A | 7/1995 | Hanks et al. |
| 5,476,542 A | 12/1995 | Doyle et al. |
| 5,489,374 A | 2/1996 | Romine et al. |
| 5,501,729 A | 3/1996 | Lewis et al. |
| 5,525,558 A | 6/1996 | Niwa et al. |
| 5,531,943 A | 7/1996 | Sudani et al. |
| 5,534,133 A | 7/1996 | Lewis et al. |
| 5,538,621 A | 7/1996 | Kalback et al. |
| 5,607,770 A | 3/1997 | Lewis et al. |
| 5,614,164 A | 3/1997 | Sumner et al. |
| 5,688,155 A | 11/1997 | Lewis et al. |
| 5,736,030 A | 4/1998 | Tsuchitani et al. |
| 5,740,593 A | 4/1998 | Sheehan et al. |
| 5,746,906 A | 5/1998 | McHenry et al. |
| 5,753,018 A | 5/1998 | Lamport et al. |
| 5,843,298 A | 12/1998 | Orac et al. |
| 5,889,081 A | 3/1999 | Kakegawa et al. |
| 5,910,383 A | 6/1999 | Hase et al. |
| 6,094,338 A | 7/2000 | Hirahara et al. |
| 6,129,868 A | 10/2000 | Penkov |
| 6,237,203 B1 | 6/2001 | Sheehan et al. |
| 6,267,809 B1 | 7/2001 | Boyer et al. |
| 6,319,392 B1 | 11/2001 | Navarro |
| 6,352,637 B1 | 3/2002 | Doolin et al. |
| 6,827,841 B2 | 12/2004 | Kiser et al. |
| 7,033,485 B2 | 4/2006 | Saver et al. |
| 7,066,997 B2 | 6/2006 | Golubic et al. |
| 7,318,891 B1 | 1/2008 | Malone |
| 7,465,387 B2 | 12/2008 | Golubic et al. |
| 8,303,676 B1 | 11/2012 | Weaver et al. |
| 8,747,651 B2 | 6/2014 | Miller et al. |
| 8,757,651 B1 | 6/2014 | Walker |
| 9,023,243 B2 | 5/2015 | Weaver et al. |
| 9,222,027 B1 | 12/2015 | Malone et al. |
| 2013/0008081 A1 | 1/2013 | Weaver |
| 2013/0011756 A1 | 1/2013 | Weaver et al. |
| 2014/0059921 A1 | 3/2014 | Weaver et al. |
| 2017/0121834 A1 | 5/2017 | Lira et al. |

FOREIGN PATENT DOCUMENTS

| | | |
|---|---|---|
| DE | 4112955 A1 | 10/1992 |
| EP | 0957150 A1 | 11/1999 |
| EP | 1739153 81 | 7/2011 |
| EP | 2285936 B1 | 5/2018 |
| IN | 201741007161 | 4/2017 |
| JP | 5262329 | 5/1977 |
| JP | 58132079 | 8/1983 |
| JP | 62116688 | 5/1987 |
| JP | 2502648 | 8/1990 |
| JP | 5125366 | 5/1993 |
| JP | 8500383 | 1/1996 |
| WO | 0074909 A1 | 12/2000 |
| WO | 2014046644 A1 | 3/2014 |
| WO | 2017086985 A1 | 5/2017 |

OTHER PUBLICATIONS

McHenry, Industrial Pitch Quality of the Future, Proceedings of the Fourth Australian Aluminum Smelter Technology Workshop, Sydney, Australia, Oct. 25-30, 1992, 1-40.

Mayer, et al, Thermal Decontamination of Railway Sleepers for Recyling. Removal of Creosote Oil, 2010 World Convention on Timber Engineering, Jun. 20-24, 2010, Trentino, Italy.

Haber, et al, Environmentally Friendly Process for Recovery of Wood Preservative from Used Copper Naphthenate-Treated Railroad Ties, ACS Sustainable Chem. Eng. 2017, 5, 10806-108014, ACS Publications, Washington, DC, United States.

Kim, et al, Two-Step Thermochemical Process for Adding Value to Used Railroad Wood Ties and Reducing Environmental Impacts, ACS Sustainable Chem. Eng. 2017, 5, 9485-9493, ACS Publications, Washington, DC, United States.

Kim,et al, Recovery of Creosote from Used Railroad Ties By Thermal Desorption, Energy 111 (2016) 226-236, Elsevier Ltd., Amsterdam, The Netherlands.

Kim, et al, Thermal Desorption of Creosote Remaining in Used Railroad Ties: Investigation by TGA (thermogravimetric analysis) and Py-GC/MS (pyrolysis-gas chromatography/mass spectrometry), Energy 96 (2016) 294-302, Elsevier Ltd., Amsterdam, The Netherlands.

Mun et al, Air Gasification of Railroad Wood Ties Treated with Creosote: Effects of Additives and Their Combination on the Removal of Tar in a Two-Stage Gasifier, Fuel 102 (2012) 326-332, Elsevier Ltd., Amsterdam, The Netherlands.

Koo, et al, Production of Bio-Oil with Low Contents of Copper and Chlorine By Fast Pyrolysis of Alkaline Copper Quaternary-Treated Wood in a Fluidized Bed Reactor, Energy 68 (2014), 555-561, Elsevier Ltd., Amsterdam, The Netherlands.

Cai, et al, Performance of a Commercial-Scale Biomass Fast Pyrolysis Plant for Bio-Oil Production, Fuel 182 (2016) 677-686, Elsevier Ltd., Amsterdam, The Netherlands.

Van Der Meulen, et al., European- and Global Urban Guided Transit: Green- and Socio-Economic Fit, Procedia-Social and Behavioral Sciences 48 (2012) 415-424, Elsevier Ltd., Amsterdam, The Netherlands.

Leslie, et al, The Effects of Weathering on the Pyrolysis of Low-Carbon Fuels: Railway Ties and Asphalt Shingles, Fuel Processing Technology 138 (2015) 463-470, Elsevier B.V., Amsterdam, The Netherlands.

Thierfelder, et al, The Creosote Content of Used Railway Crossties as Compared with European Stipulations for Hazardous Waster, Science of the Total Environment 402 (2008) 106-112, Elsevier B.V., The Netherlands.

Sanchez, Statistical Design of Experiments Applied to Organic Synthesis, Michigan State University, Oct. 11, 2006.

Velasco, et al, Process for the Production of Petroleum Tar Pitch for Anode Manufacturing, pp. 590-600, (date unknown).

Malmros, et al, Increasing Pitch Yield by Thermal Soaking of Coal Tar for Pitch Manufacture, Light Metals Proceedings of Sessions, TMS Annual Meeting, Warrendale, Pennsylvania, p. 543-548 ( 2000).

International Searching Authority; International Search Report of the International Searching Authority International Application No. PCT/US2020/022692; Patent Cooperation Treaty; pp. 1-4; publisher United States International Searching Authority; Published Alexandria, Virginia, US; copyright and dated Jul. 14, 2020; (4 pages).

International Searching Authority; Written Opinion of the International Searching Authority; International Application No. PCT/US2020/022692; Patent Cooperation Treaty; pp. 1-15; publisher United States International Searching Authority; Published Alexandria, Virginia, US; copyright and dated Jul. 14, 2020; (15 pages).

HEAT TREATMENT PROCESS AND SYSTEM FOR INCREASED PITCH YIELDS

BACKGROUND OF THE INVENTION

Field of the Invention

This invention relates to improvements in the production of carbon based pitches. More particularly, the invention relates to heat treatment of distillation byproducts from the processing of coal tar and petroleum to optimize pitch yields while minimizing quinoline insoluble content and creation of mesophase in pitch.

Description of the Prior Art

Coal is a vital starting material in producing a number of beneficial products the modernized world has come to depend upon. Most notably, bituminous coal mined from the ground may be heated in an oven called a "coke battery" through destructive distillation or carbonization of the coal to produce coke and coal tar. Coke is widely used as a fuel and as a reagent source in the production of steel. Coal tar, the dark liquid removed from the coal in the coking process, is useful as a component in sealcoat used in sealing roads, asphalt, roofs, treated wood and other construction material. Coal tar is a complex mixture of approximately 10000 primarily aromatic and semi-aromatic compounds that generally boil at temperatures ranging from 50° C. to more than 550° C., such as but not limited to benzene, toluene, xylene, indene, phenol, naphthalene, benzothiophene, quinoline, methyl naphthalene, acenaphthene, fluorene, phenanthrene, anthracene, carbazole, fluoranthene, pyrene, tetracene, triphenylene, chrysene, benzo(a)pyrene ("BaP"), coronene and benzo(ghi)perylene. Coal tar may therefore be distilled into a series of fractions, to separate and collect the various constituent components, each of which may be commercially viable products on their own. A significant fraction of the distilled coal tar material is coal tar pitch residue. This material is utilized in the production of anodes for aluminum smelting, as well as electrodes for electric arc furnaces used in the steel industry. In evaluating the qualitative characteristics of coal tar pitch, the industry focuses on the ability of the coal tar pitch material to provide a suitable binder for use in the anode and electrode production processes, Various characteristics such as softening point, specific gravity, quinoline insolubility percentage and coking value have all served to characterize coal tar pitches for applicability in these various manufacturing processes and industries.

Pitch may also be obtained from petroleum rather than coal. In such cases, oils resulting from the catalytic cracking of petroleum, such as decant oil or ethylene cracker bottoms ("ECB") may be used as the starting material to produce petroleum pitch. Decant oil is produced from the catalytic cracking and distillation of petroleum in oil refining. Decant oil is shelf stable, has a high boiling point and also includes aromatic and heterocyclic compounds. ECB is less thermally stable than decant oil and its distillation products therefore may explode in storage, so is less preferred. The pitch production processes for coal tar and petroleum may be similar to one another and may even use the same equipment but with different operating conditions. Alternatively, petroleum and coal tar pitch production systems may differ from one another. In addition, petroleum pitch may have different characteristics with respect to softening point, quinoline insoluble ("QI") percentages or coking value as compared to coal tar pitch, Blends of petroleum pitch and coal tar pitch in certain ratios are often made to address source material scarcity, cost and desired characteristics of the end product.

There are many methods to produce coal tar or petroleum pitch. For instance, FIG. 1A shows one embodiment of such a process. This prior art distillation process begins with wet crude 1 feedstock. The wet crude 1 may be either coal tar or a petroleum-derived oil such as decant oil or ECB. The wet crude 1 is introduced into a first column C1 through C1 feed line 10, which is a pipe or conduit transferring the wet crude 1 starting material into first column C1. The C1 feed line 10 may be narrow compared to the internal volume of first column C1 and therefore the wet crude 1 is under higher pressure when in the C1 feed line 10. When the wet crude 1 passes through orifice 11 and into the first column C1, it experiences a "flash" or sudden change in pressure, causing the constituent parts to separate into lower and higher boiling point components. The first column C1 is a dehydrator vessel in which the contents are heated at specific temperatures to remove the lighter fraction constituents. Alternatively, the C1 feed line 10 may pass through heat exchanger(s) to raise the temperature of the wet crude 1 prior to entry. The first column C1 is used primarily to remove water to create "dry tar" or "dry oil" in the bottom of the column, depending on the starting material, that has no more than a certain amount of water content. For instance, heaters such as steam heaters may be used to heat the first column C1 to a temperature of about 160° C. to separate out C1 distillate 12, which includes water vapor and lighter molecules having a relatively low boiling point such as water and light oils commonly referred to as "BTX," which includes benzene, toluene and xylene. These C1 distillates 12 rise to the top or "overhead" region of first column C1 and are removed through C1 vapor line 13. The remaining heavier molecules, including polyaromatic hydrocarbons ("PAH"), fall to the bottom of the column. The "bottoms" refer to the fraction of distillate with the heavier components that separates to the bottom of a distillation column as a result of mass and high boiling point. Accordingly, the C1 bottoms comprise PAH and other heavier molecules and is often referred to as "dry tar/oil" 14.

The dry tar/oil 14 from the C1 bottoms is transferred to a second column C2 through a connecting C1-C2 transfer line 15 for further distillation. Accordingly, the dry tar/oil from first column C1 is the feedstock for second column C2. The second column C2 is a fractionation column which provides multistage distillation. A distillation column with many stages provides for optimum recovery and purity of the valuable chemical. It may include a plurality of trays 20 that span at least a portion of the diameter of the column and which act as stages for distillation condensate to form, aiding in reflux of constituents to further separate the components. It may also include dumped or structured packing 21 through which the vaporized molecules rise to aid in separation. Regardless of the structure, boiled vapor travels up the column and liquid flows downward by gravity. At any stage the vapor entering from below is hotter than the liquid flowing down. This countercurrent contacting of vapor and liquid transfers heat from the vapor to the liquid. This vaporizes the lower boiling lighter components in the liquid and condenses the heavier components in the vapor. This lighter vaporization versus heavier condensation in successive stages is what separates and purifies the chemical recovery.

Distillation in second column C2 typically occurs by heating the second column C2 to bottom temperatures of about 250-270° C. and up to 360° C. by a heater at atmospheric pressure. Light distillates 22 may be removed at this stage, including naphthalene (which can be sold by itself or used in the production of dyes and plastics) and may also be concentrated in refined chemical oil ("RCO") which distills between 210-315° C. The light distillate 22 are removed from the second column C2 through a vapor line 23. A portion of the light distillate 22 may be returned to the second column C2 for refluxing to achieve further distillation and separation. The resulting C2 bottoms from second column C2 are generally called "topped tar/oil" 25, again depending on the starting material, and contain high molecular weight aromatic hydrocarbons such as PAHs, which constitute middle and heavy distillates.

The topped tar/oil 25 from the C2 bottoms is transferred from second column C2 to third column C3 through C2-C3 transfer line 26. Additional tars and pitches including topped tar, intermediate or soft pitch, characterized as soft pitch 27, having a softening point of about 40-125° C. and preferably about 90° C. (although highly dependent upon the desired endpoint softening point of the final pitch) may be added to the C2-C3 transfer line 26 to join with the topped tar/oil 25 as additional feedstock for the third column C3 if additional volume is needed or to adjust the characteristics of the incoming feedstock, to this third distillation column C3, which may contain packing 21 and/or trays, the contents are heated by a heater to temperatures above 315° C. However, care must be taken at this stage since mesophase begins to form at temperatures around 390° C. Mesophase is the precursor to coke, which will manifest as solid particles in the resulting pitch. It is important to note, however, that the term "mesophase" as utilized herein refers only to "reportable" mesophase which is greater than 4 microns. "Embryonic" mesophase of 4 microns or less is not considered mesophase for the purposes of this disclosure. Coke in the pitch is to be avoided in this particular production process since it reduces the functionality of pitch when used in anode creation for aluminum production, and in electrode formation for steel production, limits the ability of the pitch to properly wet the coke in the mixing step to make a carbon artifact such as an anode or electrode leading to decreased conductivity in the resulting product. Therefore, a vacuum may also be employed in the third column C3 to lower the boiling points at which the constituents will separate and distill.

Various distillates may be obtained from the third column C3 which are each a mixture of various components. For instance, a first medium distillate 35 distills first and may be removed from the third column C3 through distillate line 36. The first medium distillate 35 is mixture of various carbon-based molecules such as having at least 12 carbons and therefore have high molecular weights. They may be referred to as carbon black feedstock ("CBF") and may be sold to the carbon black industry to produce raw material for the rubber industry. A portion of the first medium distillate 35 may be returned to the third column C3 for refluxing and further separation.

A second medium distillate 38 may be removed from the third column C3 through a distillate line 39. The second medium distillate 38 may include those compounds used to make creosote wood preservative which nay be separated from the remainder of the distillate for further refining and use in other applications, such as for treating railroad ties, telephone poles and other wood preservative applications. A portion of the second medium distillate 38 may be returned to the third column C3 for refluxing and further separation.

Heavy distillate 41 includes even higher molecular weight components. It may be removed from the third column C3 through vapor line 42. Heavy distillate 41 is a co-product and may include carbon black feedstock. A portion of the heavy distillate 41 may be returned to the third column C3 for refluxing and further separation.

Remaining in the third column C3 in the C3 bottoms is coal tar pitch 50. This pitch 50 is a thick black liquid that contains a mixture of chemicals, including PAHs, and is the desired final product of the pitch production system described above. It can be removed from the third column C3 through pitch outlet line 51 and used in subsequent applications. This pitch 50 will be characterized by various qualities, including softening point, specific gravity, QI percentage and coking value to determine its quality and applicability in various manufacturing processes and industries. The distillation processes may be adjusted with various fractions of distillates being removed at different times and/or in different volumes to selectively modify the resulting characteristics of the produced pitch 50 as may be desired. For instance, coal tar pitch 50 having a Mettler softening point of about 108-140° C. and no more than 10-20% QI may be used as binder in anode and electrode production. A lower QI will be required for impregnation pitch.

In a second embodiment of prior art pitch production, as shown in FIG. 1B, the wet crude 1 feedstock is flashed into the first column C1 for dehydration through orifice 11. Light oils and water are removed as C1 distillate 12 and the dry tar/oil 14 is transferred to second column C2 through transfer line 15.

The second column C2 is a multistage fractionator as in the other prior art process and is heated by a heater to temperatures of about 250-270° C. at atmospheric pressure. However, in this embodiment, light distillate 22 is distilled and removed by vapor line 23 and medium distillate 38 is distilled and removed by distillate line 39 from the second column C2. The light distillate 22 may include refined chemical oil ("RCO") and other light distilled oils. The medium distillate 38 may include creosote which may be further separated and refined. The light and medium distillate 22, 38 may be combined and stored together or may be subsequently processed for refined creosote production.

In this embodiment, the topped tar/oil 25 in the C2 bottoms are then moved to a fourth (third for this embodiment) column C4 through C2-C4 transfer line 26' and introduced or flashed into fourth column C4 by an orifice 11, which may be a sparger. This flashing separates out heavy distillate 41 such as heavy oils from the remaining residue, allowing the heavy distillate 41 to be removed from fourth column C4 by the vapor line 42. The components of the heavy distillate 41 may subsequently be separated by further distillation or processing, producing carbon black pitch and other aromatic compounds. The residue at the bottom of the fourth column C4 is pitch 50, which may be coal tar pitch if starting with coal tar or petroleum pitch if starting with decant oil.

A third embodiment of prior art pitch production, as shown in FIG. 1C, utilizes four columns for distillation and/or separation of oils from the residue in forming pitch. Specifically, the wet crude 1 is first dehydrated in a first column C1 to remove C1 distillates 12 including water and light oils. The dry tar/oil 14 is then distilled in a fractionator second column C2 to remove light distillate 22. The resulting topped tar/oil 25 is then transferred to another fractionator third column C3 where medium distillate 38 is removed. In this embodiment, the residue from third column C3 is transferred to a fourth column C4 which is a flash column where sudden pressure differential separates out the heavy distillate 41. What remains is the desired pitch 50.

The above prior art pitch production processes may generate between 15-60% pitch yield, as calculated from the starting materials of one of coal tar and decant oil, depending on process parameters. Optimization of processes and increased product yields are important but difficult to determine and have proven even more difficult to implement successfully at industrial scale for commercially salable goods.

One method of optimizing yields includes heat treatment (also referred to as thermal treatment or heat soaking) of distillates and byproducts to use as feedstock in pitch production. The heat treatment process is recognized as having three primary parameters: temperature, pressure and residence time.

Many attempts have been made to identify methods of improving pitch yield (and other properties) through the use of heat treatment, with widely varying degrees of performance and little commercial success at the industrial production level necessary for commercial development. Each reference provides broad disclosures of times and temperatures with little understanding of the mechanics which lead to increased yields and poor disclosure of actual time and temperature combinations which are associated with particular yield performance.

U.S. Pat. No. 3,140,248 discloses the preparation of binder pitch utilizing a soaking step. A petroleum fraction having a boiling point of 200-650° C. is catalytically cracked and then thermally cracked. The thermal residue obtained from thermal cracking is subjected to a soaking zone with temperatures from 480-590° C. for 4-20 minutes at 30-400 psi. Short residence times and high lineal velocities are preferred to minimize coking. The use of a soaking coil is disclosed without further detail.

U.S. Pat. No. 3,318,801 discloses the use of a thermal soaking drum and a short tube heater. The thermal soaking drum is utilized at a temperature of 340-425° C. and 0-30 psi(g) for 3-90 minutes. The heating tube induces rapid heating to 425-510° C. at 25-250 psi(g) for 2-30 minutes.

U.S. Pat. No. 3,673,077 discloses heat soaking for the production of binder pitch to increase toluene insoluble ("TI"). Conditions are 350-450° C., pressures of about 75 psi(g) and residence times of 15 minutes to 25 hours. It also discloses air being optionally passed through the reactor.

U.S. Pat. No. 4,039,423 discloses the heat treatment of decant oil to form a petroleum pitch. Conditions include 413-524° C. at 220-440 psi(g) with residence times of 3-300 minutes. Continuous flow conditions are preferred with turbulent flow rather than laminar flow to minimize coke formation and maintain any QI in suspension. This also increases efficient mixing of materials and reduces reaction time. Softening points of products range from 79-135° C.

EP Patent No. 1 739 153 discloses the use of thermal treatment of coal tars and distillates under inert atmosphere. Conditions are 340-400° C. at less than 145 psi(g) and residence time of 3-10 hours. A preferred embodiment is 370-400° C. at 14 psi(g) for 4-6 hours. It is speculated that thermal treatment under inert conditions increases planarity of molecules and stabilization of the reaction product, limiting side reactions. This improves wettability, graphitizability and reaction yield. Starting materials include anthracene oil.

U.S. Pat. No. 8,757,651 discloses the use of heat treatment at 350-440° C. of a coal tar distillate under 50-120 psi(g) pressure to produce pitch. Residence times range from 1 to 7 hours. Starting materials include creosote oils with low QI. It is speculated that heat treatment can polymerize the relatively low molecular weight components into larger molecules. Downstream distillation of the product is contemplated to separate different species. Ultimate products may have a coking value of 55-70% and 90-140° C. softening point. Less than 15% QI is also a target. Batch and flow through heat treatments are contemplated but no details of the reactor are given.

U.S. Pat. No. 9,222,027 discloses heat treatment utilizing an electrically heated tubular reactor operating at high velocity and pressure. Salt and molten metal baths are also disclosed. Conditions are 450-560° C. at 500-900 psi(g) with residence times of 1-2 minutes. Laminar and turbulent flow in the reactor pipe are addressed, with turbulent flow being preferred. Reynolds number for turbulent flow is generally accepted as above 4000. Reynolds number above 10000 is preferred and 25000 gives best experimental results. Speculation of use of Reynolds number above 50000 is presented with no empirical or experimental data.

United States Patent Application Pub. No. 20170121834 discloses production of petroleum pitch utilizing a heat treatment. A soaker reactor is utilized in the range of 360-460° C. at 215-265 psi for 15 minutes to 5 hours. An inert environment, or at least oxygen free, is required. Starting materials include decant oil, lubricant extract and gasoils.

Despite these efforts, there is still room for improvement as the prior art solutions have not achieved commercial success. What remains unknown in the art, therefore, is a method and apparatus for heat treatment which may be applied to coal tar and petroleum byproducts and produces predictable and repeatable results at commercial scale operations. Critical limitations on the application of the prior art include creation of excess coke or mesophase following heat treatment which prevents continuous processing of the starting materials. This is typically attributable to excess application of treatment or excess variability in the time and temperature of processing. The teachings of the prior art utilizing recirculation of a batch reactor's content will identify the same as detrimental to pitch quality.

SUMMARY OF THE INVENTION

Heat treatment processes are disclosed which subject distillate byproducts from coal tar or petroleum production to thermal processing for increased pitch yields with a particular emphasis on parameters relating to time, temperature and pressure to minimize coking and mesophase production. Corresponding coal tar or petroleum pitch production processes are disclosed which utilize the heat treatment processes.

Specifically, the heat treatment processes of the present invention utilize as a starting material heavy distillate that is distilled in late stage pitch production and decant oil from petroleum production. The present heat treatment processes subject these starting materials to heat treatment at specific temperatures, pressures and residence times to recover additional pitch and increase total pitch yields. Accordingly, the present heat treatment processes increase the efficiency of the overall pitch production while also obtaining value from otherwise less economical byproducts. Control of related temperature, pressure and residence variables in the heat treatment process is critical to retain minimal QI levels and avoid mesophase formation. The present invention utilizes high temperature ranges which may extend in excess of 510° C. and pressure ranges in excess of 60-300 psi(g) to keep the starting raw material and the reactants in the liquid phase so they move consistently throughout the heat treatment system. However, since mesophase is known to form around 390° C., the present invention contemplates corresponding residence times in the process to minimize the possibility for mesophase formation and therefore coking. The present invention also attempts to achieve, as is physically possible in real world conditions, turbulent heating of the feed material followed by a plug flow through the reactor section of the heat treatment devices with the goal of maintaining a continuous and consistent flow of starting material through the system for roughly equivalent exposure to the heat, which will be arbitrarily identified as "near-uniform flow." References within this specification to plug flow are to be understood as near-uniform flow. Longer periods of time in the system increases the possibility of mesophase formation and coking, which may be accommodated through lower temperatures, but is not preferred. The heat-treated starting materials may then routed back into the pitch production process as part of a continuous process as added feedstock to increase yields.

In addition, there is indication that the softening point of commercially utilized pitch will tend to increase in the future. Currently, the softening point of most commercial pitch and pitch blends is in the range of 90-150° C. Lower softening points of the pitch are a result of the presence of high PAH content and reducing this content will raise the softening point. Many of these compounds may be carcinogenic and some states and countries are becoming increasingly sensitive to exposure to these materials by people and the environment. The softening point of pitch may therefore increase in the future since removing more of these high PAH compounds will remove the potentially carcinogenic compounds but will also increase the softening point as a result, Heavy distillate includes many highly aromatic compounds and increasing the amount of heavy distillate removed during pitch formation is known to produce a higher softening point in the resulting pitch. Having a way to utilize this additional heavy distillate withdrawn will be beneficial, especially if it can be used to generate further pitch. The systems and processes disclosed here provide such a benefit.

The heat treatment and pitch production systems and processes, together with their particular features and advantages, will become more apparent from the following detailed description and with reference to the appended drawings.

DESCRIPTION OF THE DRAWINGS

Like reference numerals refer to like parts throughout the several views of the drawings.

DETAILED DESCRIPTION OF THE PREFERRED EMBODIMENTS

Figure 1A:
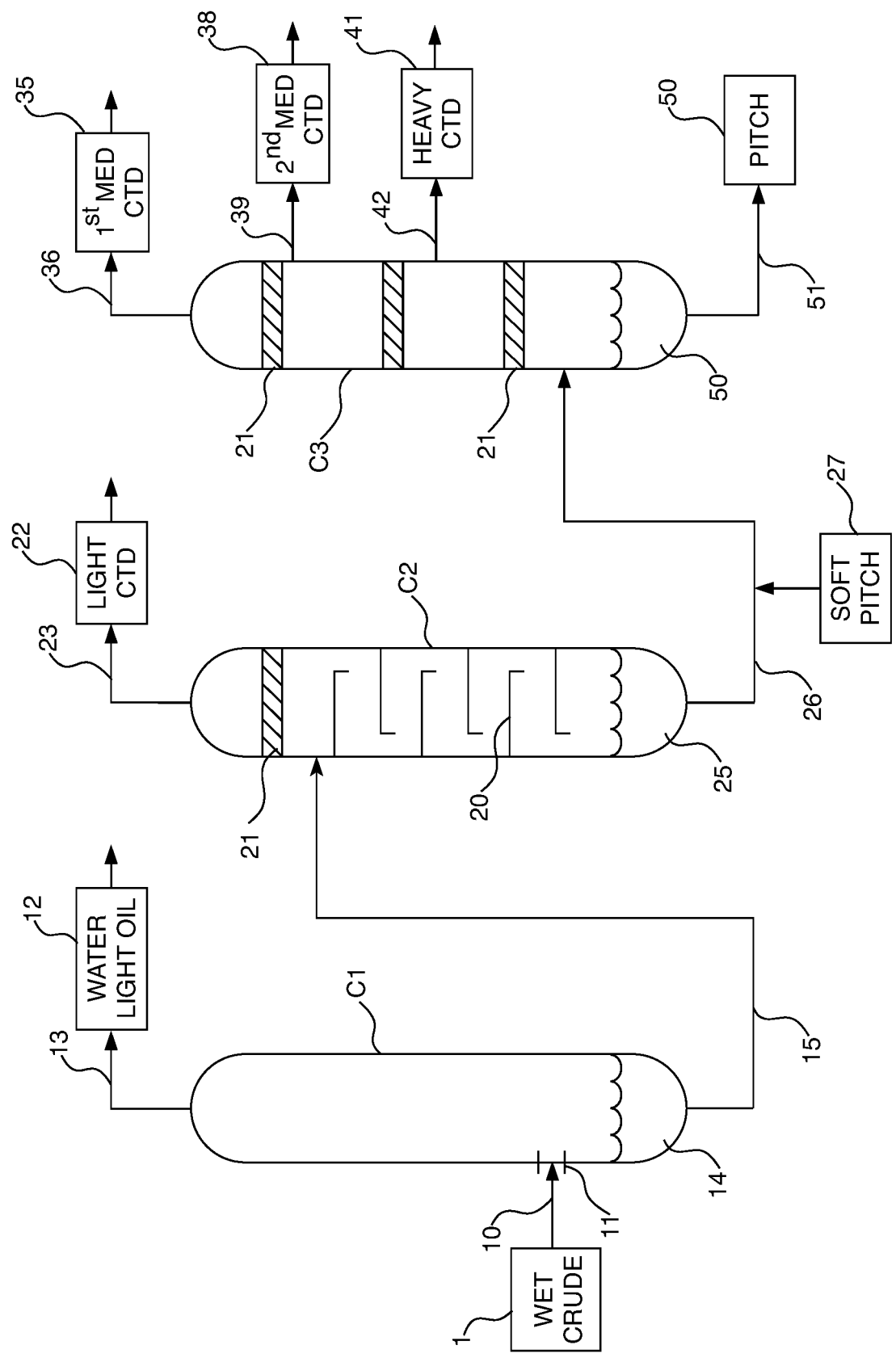
FIG. 1A is a schematic diagram of a first embodiment of a prior art system for producing pitch from wet crude coal tar or decant oil.
Figure 1B:
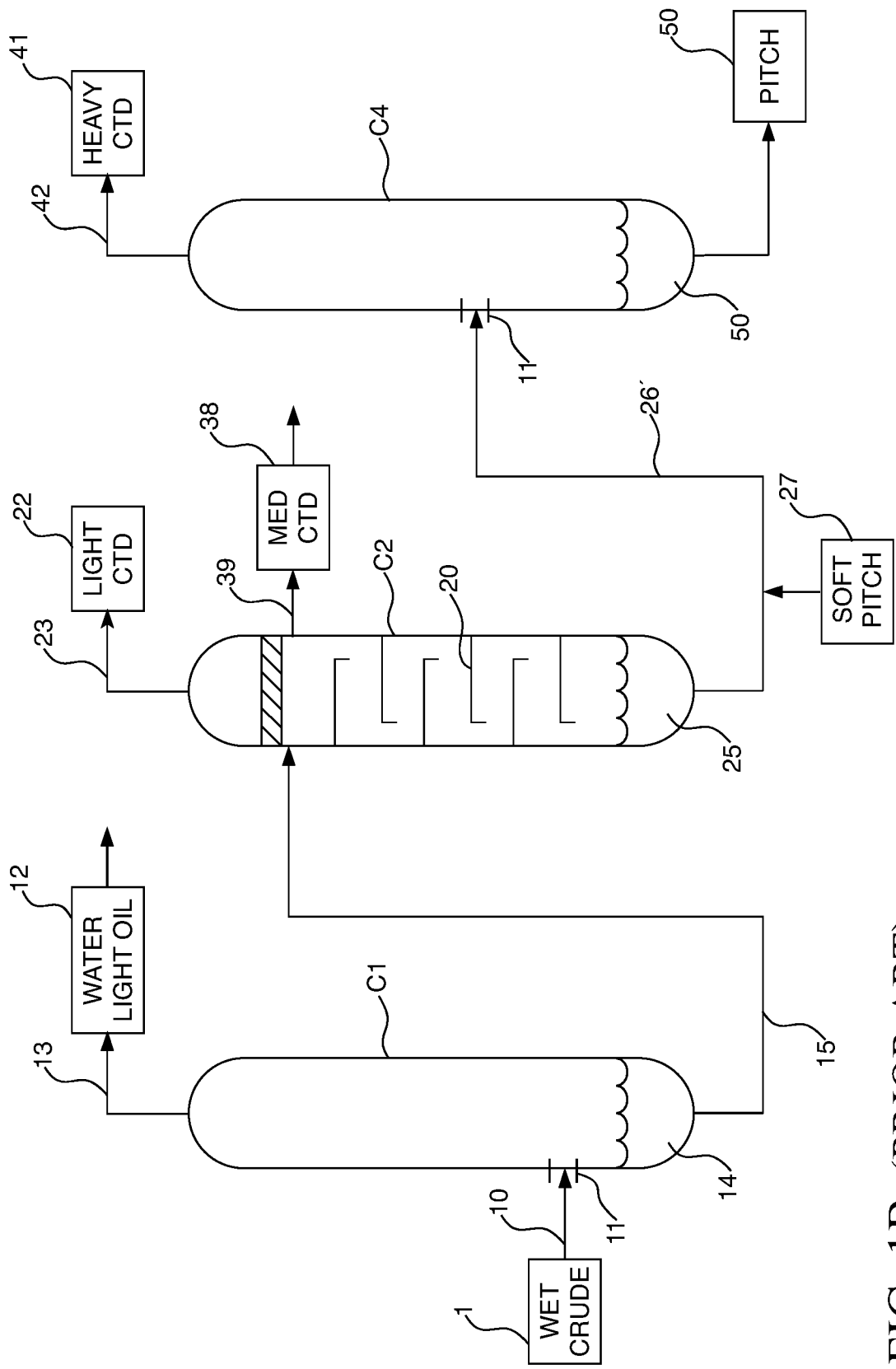
FIG. 1B is a schematic diagram of a second embodiment of a prior art system for producing pitch.
Figure 1C:
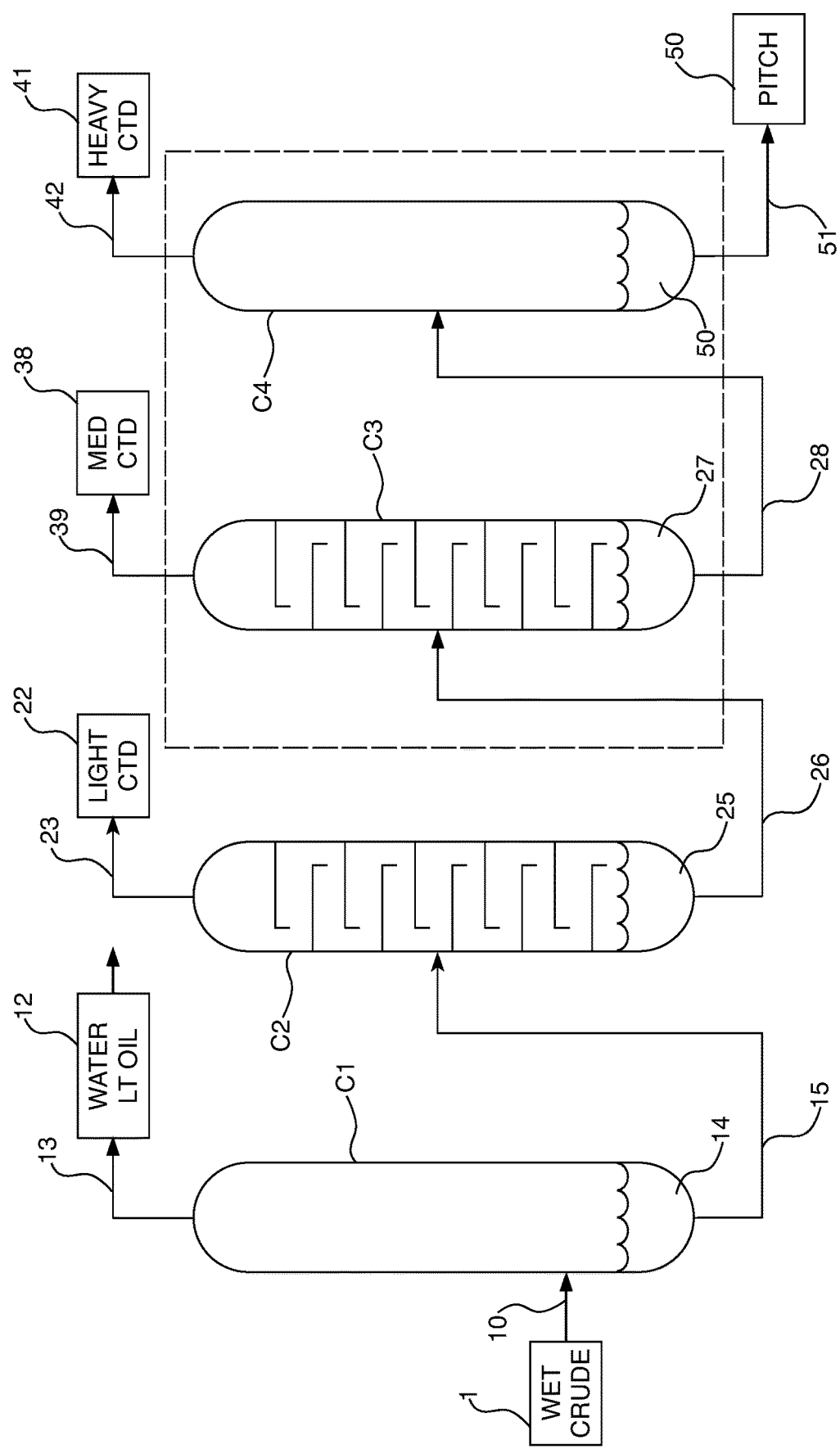
FIG. 1C is a schematic diagram of a third embodiment of a prior art system for producing pitch.
Figure 2A:
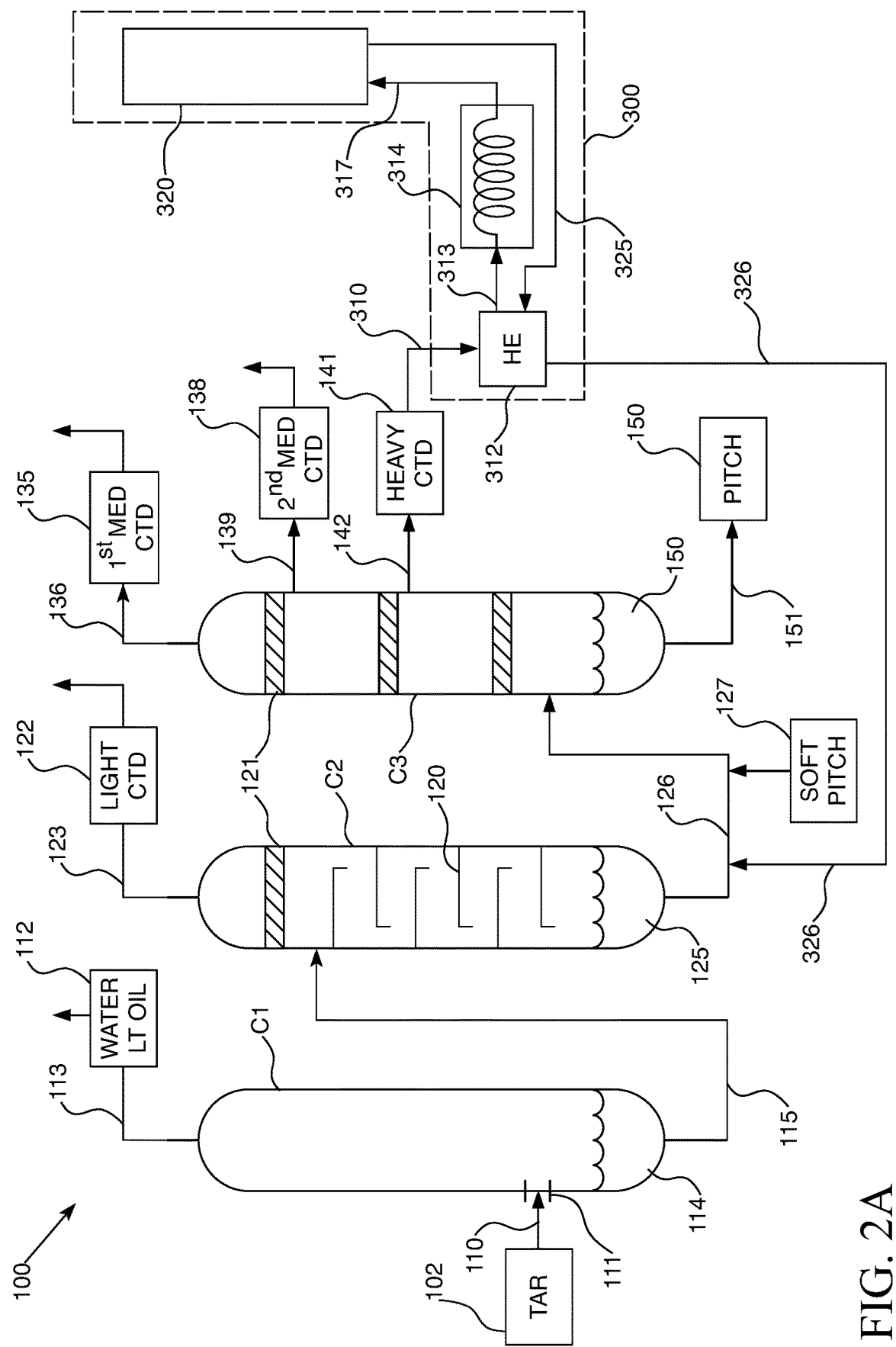
FIG. 2A is a schematic diagram of a first embodiment of the pitch production system of the present invention incorporating heat treatment for producing increased yields of pitch from coal tar.
Figure 2B:
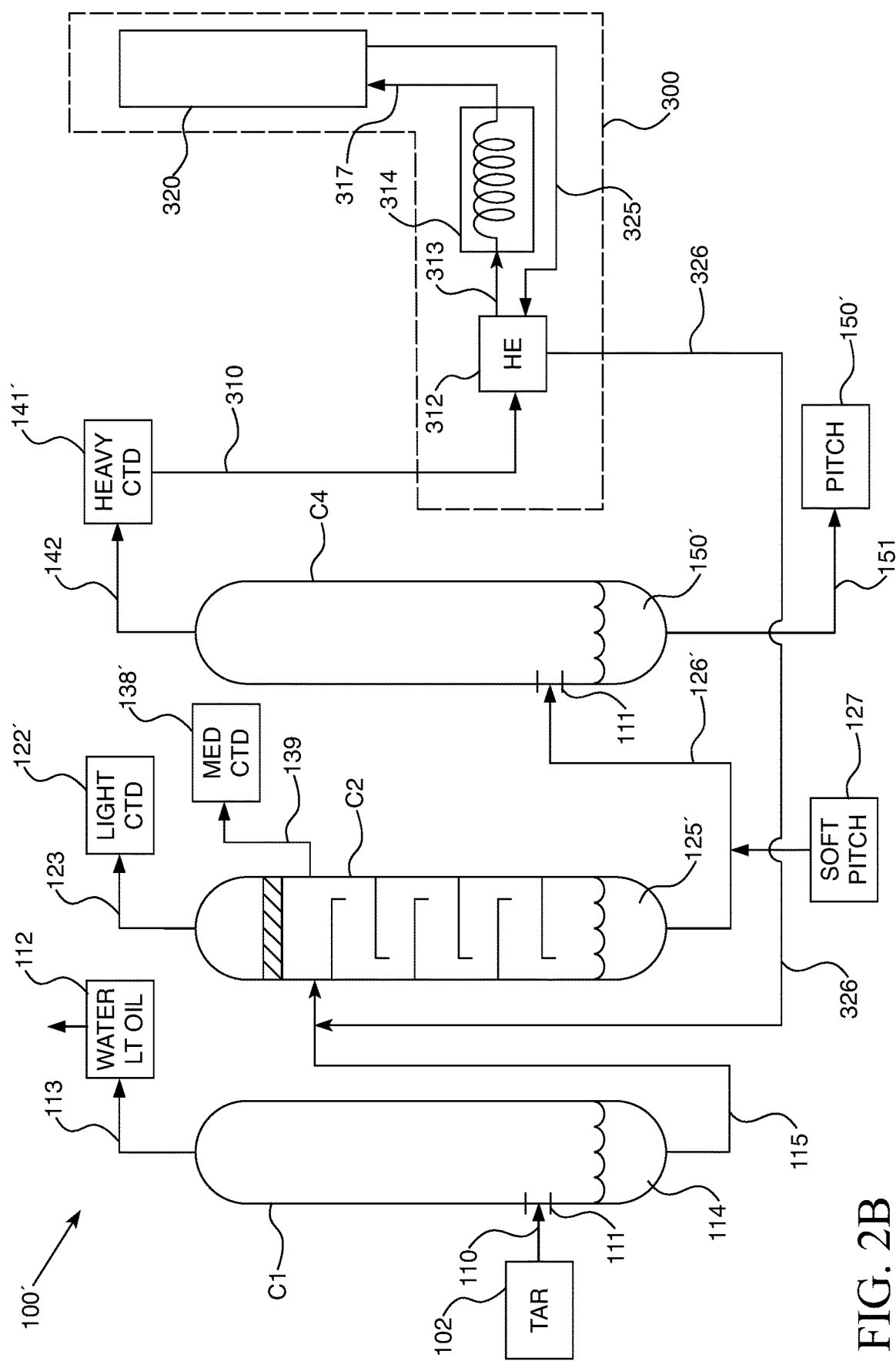
FIG. 2B is a schematic diagram of a second embodiment of the pitch production system of the present invention incorporating heat treatment for producing increased yields of pitch from coal tar.
Figure 2C:
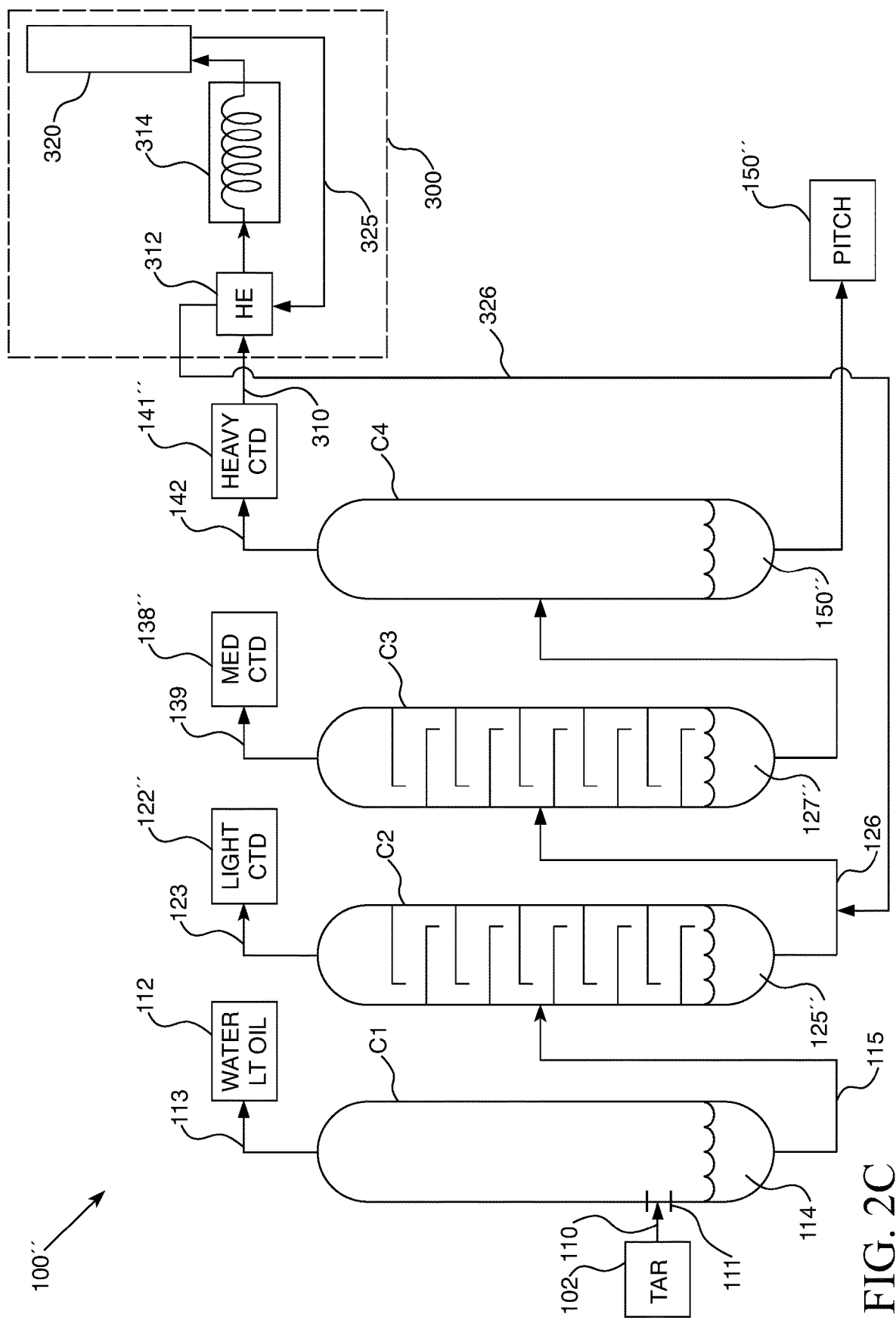
FIG. 2C is a schematic diagram of a third embodiment of the pitch production system of the present invention incorporating heat treatment for producing increased yields of pitch from coal tar.
Figure 3A:
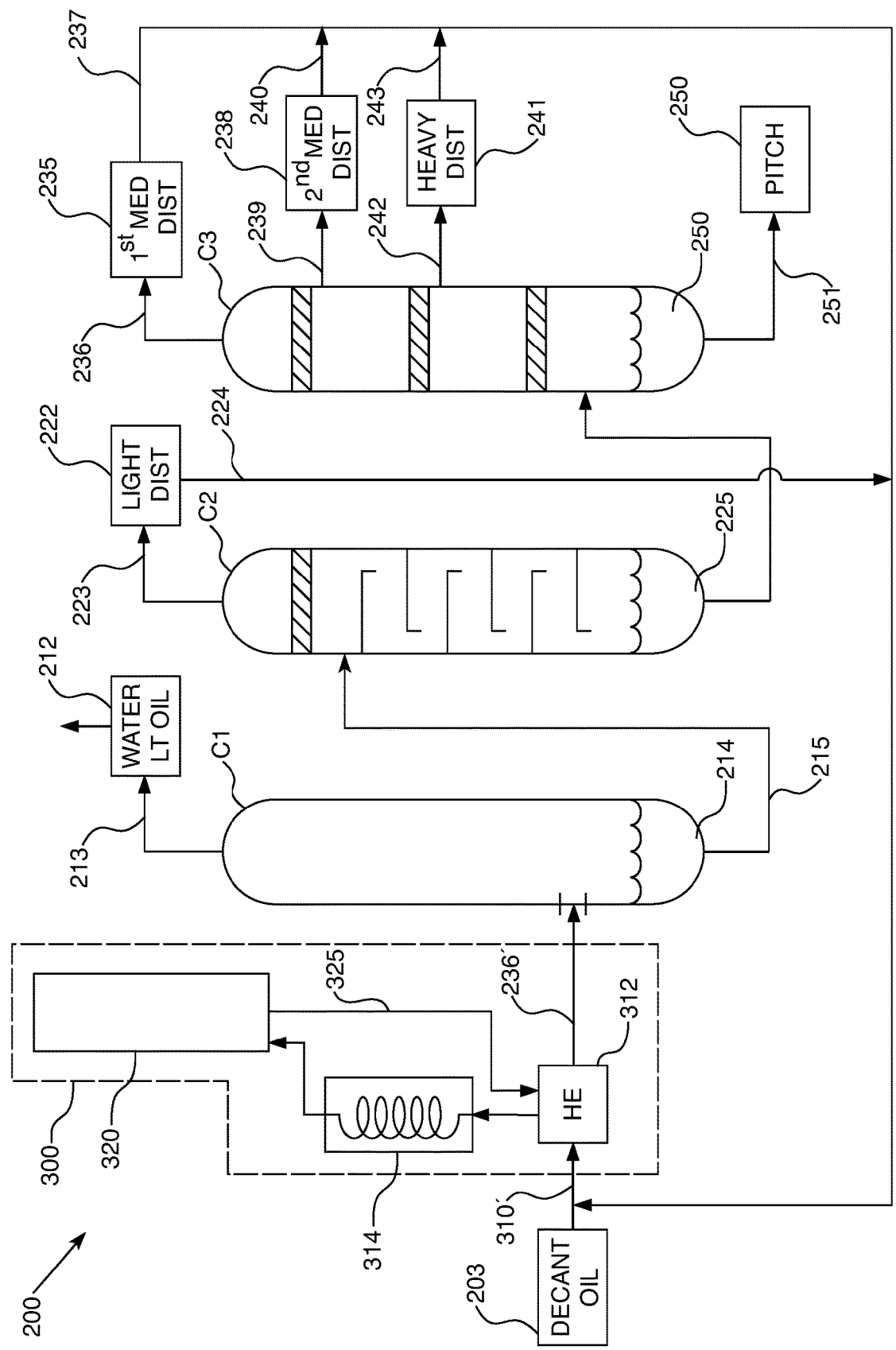
FIG. 3A is a schematic diagram of a first embodiment of the pitch production system of the present invention incorporating heat treatment for producing increased yields of pitch from petroleum byproducts such as decant oil.
Figure 3B:
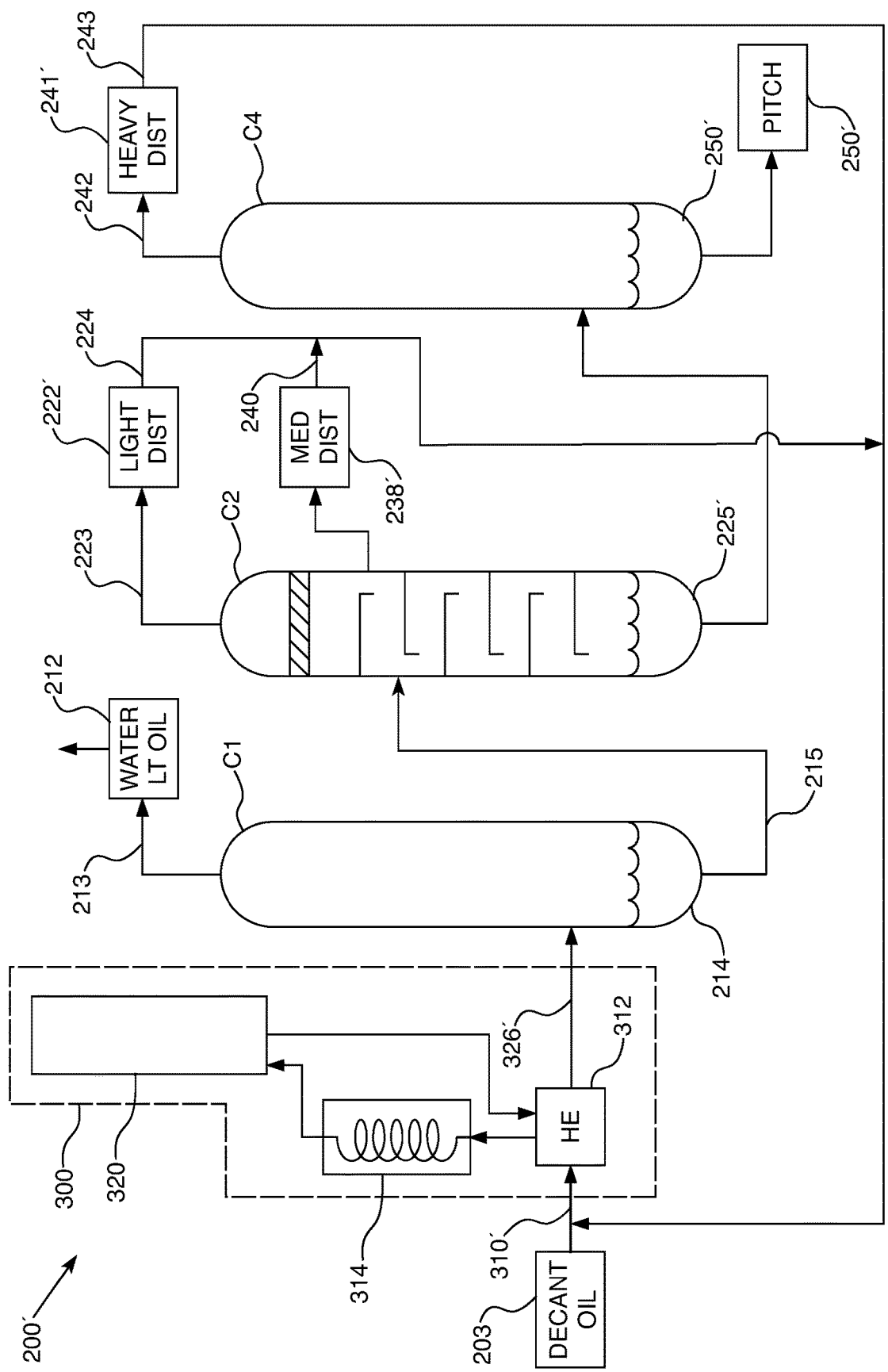
FIG. 3B is a schematic diagram of a second embodiment of the pitch production system of the present invention incorporating heat treatment for producing increased yields of pitch from petroleum.
Figure 3C:
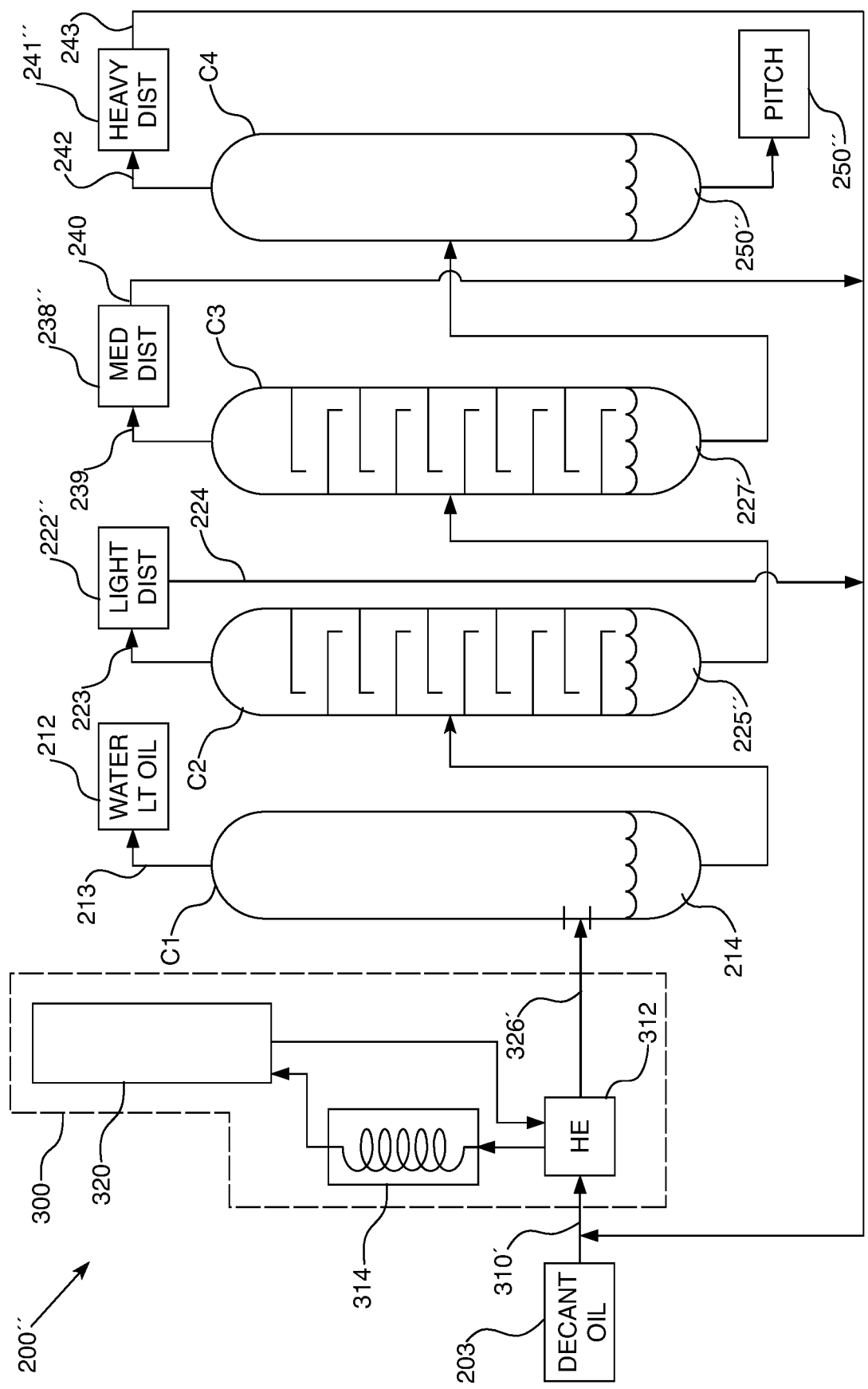
FIG. 3C is a schematic diagram of a third embodiment of the pitch production system of the present invention incorporating heat treatment for producing increased yields of pitch from petroleum.
Figure 4A:
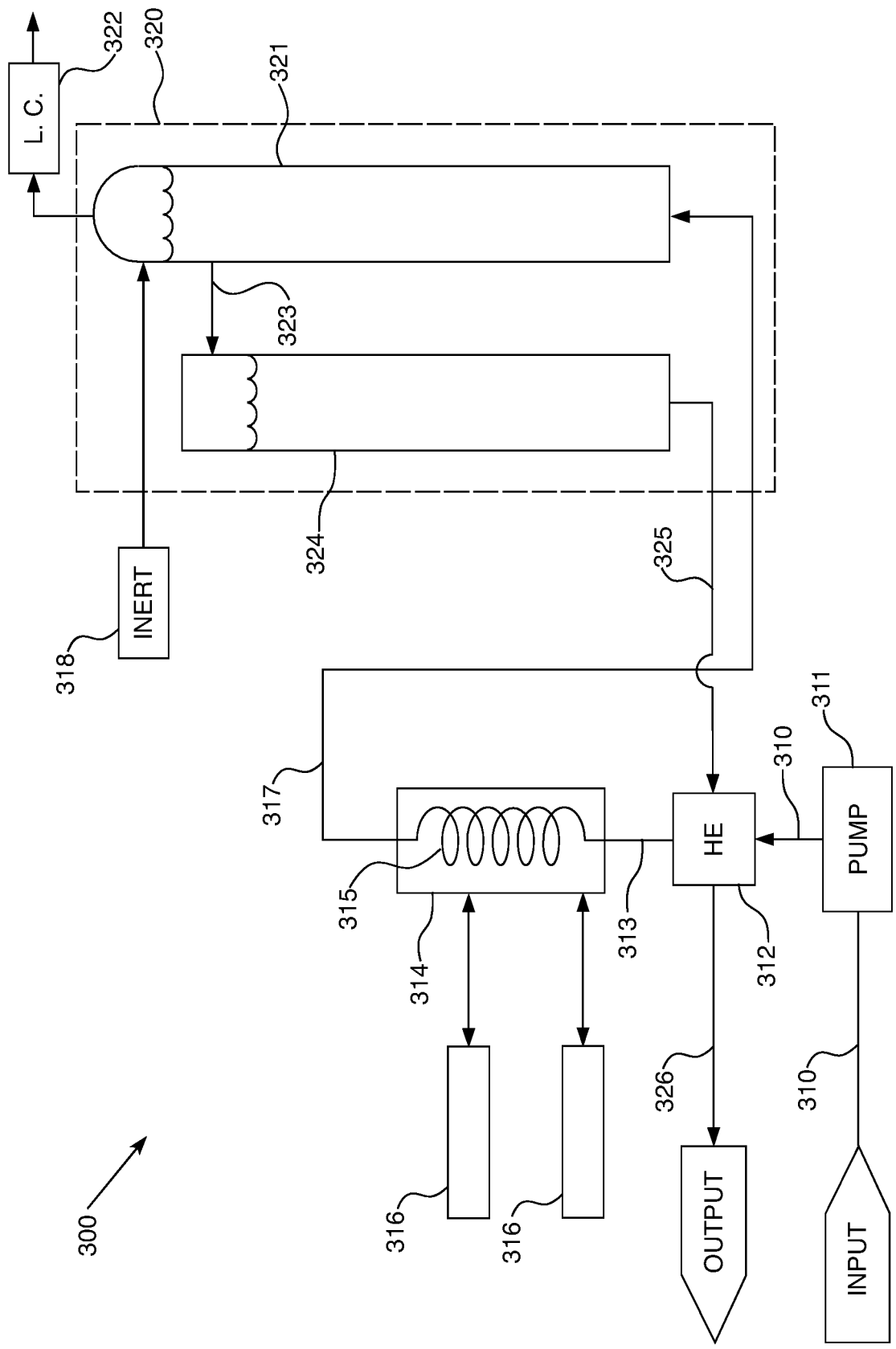
FIG. 4A is a schematic diagram of a first embodiment of the heat treatment system of the present invention.
Figure 4B:
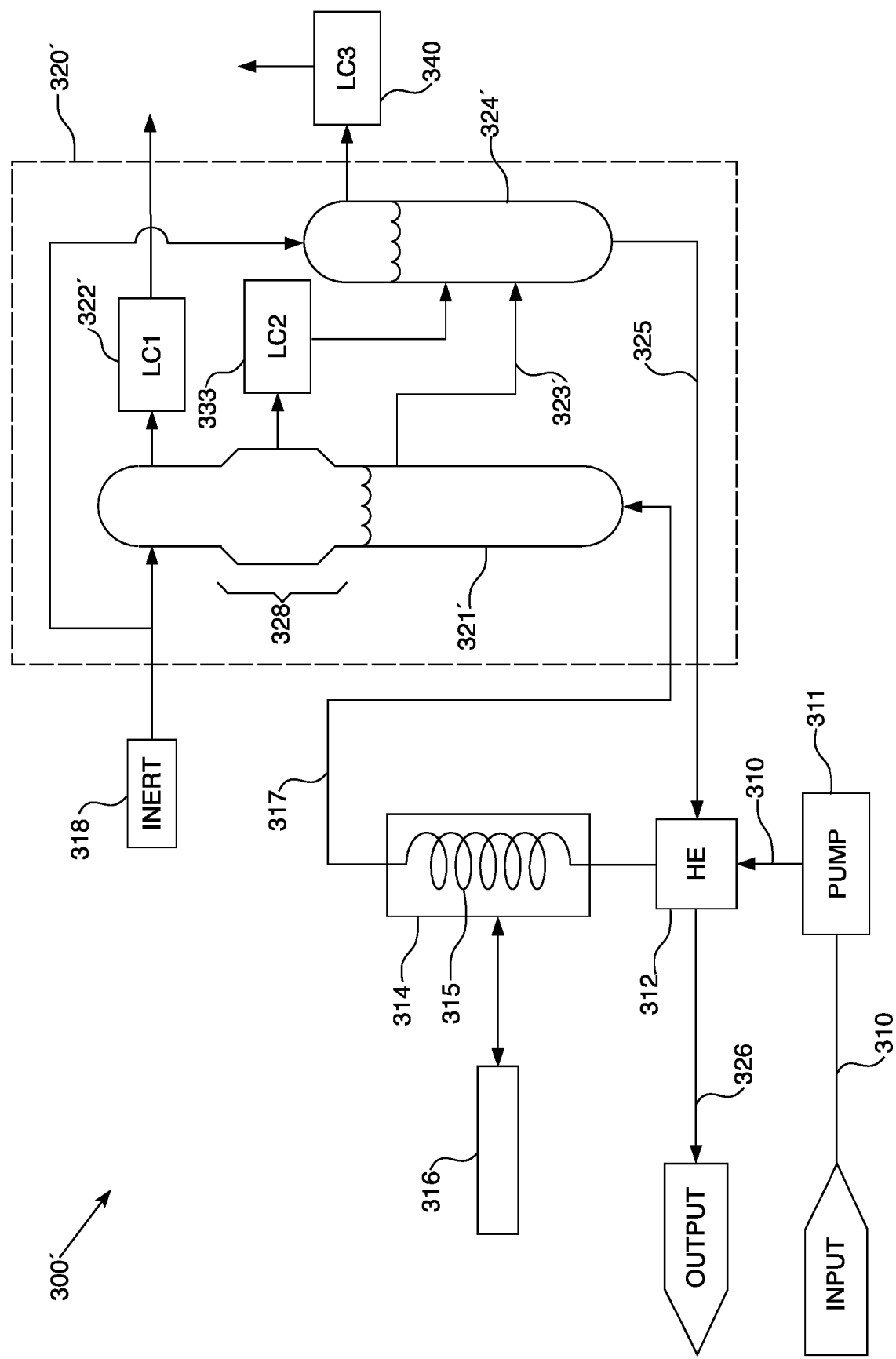
FIG. 4B is a schematic diagram of a second embodiment of the heat treatment system of the present invention.

As shown in the accompanying drawings, the present invention is directed to heat treatment systems 300, 300' and pitch production systems 100, 100', 100" (from coal tar) and 200, 200', 200" (from petroleum) utilizing the same. For instance, FIGS. 2A-2C illustrate various embodiments of producing coal tar pitch 150 from coal tar 102 and FIGS. 3A-3C illustrate various embodiments of producing petroleum pitch 250 from decant oil 203. Various heat treatment systems 300, 300' are shown in FIGS. 4A-4B that may be used with any of the pitch production systems.

Coal Tar

Turning first to the coal tar pitch production systems, a first embodiment of the pitch production system 100, shown schematically in FIG. 2A, begins by dehydrating coal tar 102. Crude coal tar 102 will likely have some water or moisture content from the initial coking process but should be less than about 4 wt. % moisture level so as not to slow down the tar processing. To dehydrate the coal tar 102, it is transported to a first column C1 by a C1 feed line 110. C1 feed line 110 may pass through at least one heat exchanger (not shown) in which heat from other elements of the system is applied to the C1 feed line 110, thus preheating the tar 102 in the C1 feed line 110 while cooling the other component.

Heat exchangers as disclosed herein and in the figures do not permit mixing of the components but are in sufficient contact to allow heat to move from the hotter component to the cooler component. This makes efficient use of the heat generated in the system, which can be particularly important in industrial-scale production runs where the cost to heat components of the system can be very expensive and may require a lot of fuel. There may be a plurality of heat exchangers positioned throughout the system to make effective use of heat. In at least one embodiment, the heat exchangers may include routings of various distillate lines to cool the corresponding distillate for storage while heating the other component, such as tar 102 feedstock. In other embodiments, heat exchange oil may be utilized in the heat exchangers to heat the cooler component.

In at least one embodiment, the coal tar 102 has an initial temperature of about 50° C. The coal tar 102 is heated to about 160° C. as the C1 feed line 110 travels through least one, or in some cases more than one, heat exchanger. Thus, when the coal tar 102 enters the first column C1 it is at a temperature of at least 160° C. Because the coal tar 102 is being pumped through the C1 feed line 110, it is under pressure, such as about 100 psi. The first column C1 is an atmospheric pressure column at about 1 atm of pressure (about 14.3 psia). As the coal tar 102 enters the first column C1 through orifice 111, the sudden drop in pressure flashes the coal tar 102, causing its constituent components to begin to separate. Preferably, there is no reboiler or other heater to heat the first column C1, so the heat of the first column C1 is about that of the incoming wet coal tar 102, at least 160° C.

Water vapor and distilled light oils, such as BTX, travel up the first column C1 and are removed by C1 vapor line 113, and may be condensed by cooling water condensers at a maximum temperature of about 75° C. before being collected as C1 distillate 112. Water distills at an approximate temperature of about 100° C. The light oils also distill at about this same temperature: benzene (80° C.), toluene (110° C.) and possibly xylene (144° C.). Thus, these light oils and water are distilled and collected together. The light oils, approximately 1% of the coal tar feed, are immiscible in water and are decanted as the top layer of the C1 distillate 112 and pumped to storage. The specific gravity of the light oils should be monitored and not allowed to be too high, such as no more than about 0.92 at 15.5° C., as this can lead to poor separation from the condensed water. This may occur if the wet coal tar 102 feed for first column C1 is too high.

Distillation in the first column C1 continues until the dry tar 114 collecting in the C1 bottoms is reduced to about no more than about 2.5 wt. % water content, preferably less than 0.5%, and may further be characterized as having a specific gravity of at least 1.15 at 15.5° C. This dry tar 114 may then be removed from the first column C1 through transfer line 115, which may travel through at least one heat exchanger to increase the temperature of the dry tar 114 to about 250-270° C. before entering the second column C2 for tar topping.

In the second column C2, the dry tar 114 undergoes further distillation to recover light distillate 122, which may include crude naphthalene as RCO, in a process referred to as "tar topping" since it removes to lowest boiling fraction, or top distillate, of the dry tar 114, The incoming dry tar 114 is already at a temperature of about 250-270° C. when it enters the second column C2 and may be pumped in under flow control at a C2 feed flow rate that is based on the heater, vacuum and condenser systems relating to the second column C2. The second column C2 is an atmospheric pressure column at 1 atm pressure with distillation trays 120 below the dry tar 114 feed point. In at least one embodiment there may be 20-30 trays in the second column C2. There may also be at least one packed column section or packing 121 above the dry tar 114 feed point for rectifying the purity of light distillate 122 as it distills. A heater, such as a fired process heater reboiler or other suitable heating source, may be associated with the second column C2 to heat the bottom contents to a temperature of about 350-360° C. and distill further light distillate 122. Light distillate 122 vapor travels up the second column C2, is typically removed though distillate line 123 at a rate of about 15-22% of the C2 feed rate. The light distillate 122 may then be condensed by condenser(s) to convert to liquid form, which may include RCC with naphthalene, and may further be water cooled by a heat exchanger. Preferably, the light distillate 122 may include between 55-65% naphthalene content and may be further processed in refineries to separate and purify the naphthalene. The light distillate 122 also preferably has maximum specific gravity of 1.03 at 70° C. The light distillate 122 may also be characterized as in Tables 1 and 2 provided below. At least a portion of the light distillate 122 may be returned to the top of second column C2 for refluxing to limit the amount of higher boiling compounds in the light distillate 122 and increase the naphtha content of the light distillate 122. It is to be specifically noted throughout this disclosure that all distillation and vapor streams may alternatively be removed, stored for further use in the future and inserted into these processes at the appropriate point, as would be well known to one skilled in the art. This liquid C2 reflux condenses the higher boiling compounds in the vapor above the feed point and improves the separation efficiency of the second column C2's top rectification section. The light distillate 122 may be refluxed at a rate of at least 10% the C2 feed rate to increase naphthalene content in the light distillate 122. About 15-22% of the original coal tar 102 may be removed as light distillate 122.

The C2 bottoms contain the topped tar 125 which are then transferred to a third column C3 through transfer line 126 for pitch production at the desired softening point. Heat is conserved along transfer line 126 so the topped tar 125 entering the third column. C3 is about the same temperature as the C2 bottoms. Optionally, soft pitch 127 may be added to transfer line 126 prior to the third column C3, to combine with the topped tar 125 as C3 feedstock to adjust the temperature, increase the volume of feedstock, or to remove any remaining oil from the added soft pitch. The third column C3 is preferably a vacuum column operating at an absolute pressure of about 40-100 millibar (about 0.77-1.9 psia absolute). It may also have a combination of trays 120 and a packed top column sections 121 for multistage distillation. A heater, such as but not limited to a fired process heater reboiler, may be used to heat the C3 column bottoms to temperatures of about 350-360° C. to boil heavy oil distillates out of the topped tar 125 by recirculation of C3 bottoms liquid.

As the topped tar 125 is distilled in the third column C3, distillate vapors rise through the column and are condensed by the recirculation of various distillates. Specifically, a first medium distillate 135 is extracted through distillate line 136 and may be cooled externally with other process, heat transfer oil streams, or water to condense. It may be characterized as identified below in Tables 1 and 2. First medium distillate 135 is an intermediate carbon black feedstock product that is produced primarily to support other product quality and as a blending oil. A portion of it may be refluxed back into the third column C3 or may be routed for storage and sale. Approximately less than 5% of the initial coal tar 102 is distilled as first medium distillate 135.

A second product from the third column C3 is second medium distillate 138, which may include components to be used as creosote such as WEI-C or AWPA creosote base oil.

The second medium distillate 138 is removed through distillate line 139 and may be cooled externally with other process, heat transfer oil streams, or water to condense. About 13-22% of the total crude tar 102 is distilled as second medium distillate 138. The second medium distillate 138 may be characterized as identified below in Tables 1 and 2, and/or by a 10% maximum distillation to 300° C. a 65-90% maximum distillation to 355° C. and in certain cases (particularly in Europe) a maximum of 10 ppm of benzo(a) pyrene. At least a portion of the distilled second medium distillate 138 may be returned or recirculated to the third column C3 for refluxing. The creosote contained within the second medium distillate 138 is very useful in other industries such as a wood preservative and therefore may be monitored for quality control by monitoring its distillation range and content of benzo(a)pyrene. The second medium distillate 138 quality is controlled by its product rate, preferably in the range of 14-20% of the total crude coal tar 102, and its temperature as it is recirculated back to the third column C3 for reflux, which is preferably in the range of 100-115° C.

A third product obtained from distillation of the topped tar 125 in the third column C3 is heavy distillate 141, which is removed through distillate line 142 and may be cooled externally with other process, heat transfer oil streams, or water to condense. This heavy distillate 141 is also a mixture of components including mostly carbon black feedstock but has additional components not found in first medium distillate 135, as shown in Table 1 below, which increases the PAH levels and boiling point for heavy distillate 141. In addition, heavy distillate 141 has extremely low, virtually zero concentration of QI and toluene insolubles. It may also be characterized by a 10% maximum distillation to 355° C. At least a portion of the heavy distillate 141 may be returned to the third column C3 for further distillation and separation through refluxing. About 14% of the total crude tar 102 may be distilled off as heavy distillate 141.

The various distillates of interest in the first embodiment of the coal tar production system 100 may be generally characterized as shown in Tables 1 and 2 below, the component amounts of which may vary depending on the target softening point of the pitch being produced.

TABLE 1

| Component | Light distillate (% total) | 1st Medium distillate (% total) | 2nd Medium distillate (% total) | Heavy distillate (% total) |
|---|---|---|---|---|
| Benzene | 0.20 | | | |
| Toluene | 0.30 | | | |
| Ethylbenzene | 0.20 | | | |
| m+p Xylene | 0.30 | | | |
| Styrene | 0.20 | | | |
| o Xylene | 0.24 | | | |
| 3+4 Ethyl toluene | 0.10 | 0.07 | | |
| 1,3,5 Trimethyl benzene | 1.14 | 0.03 | | |
| Phenol | 0.73 | 0.05 | | |
| 1,2,3 Triethyl benzene | 0.10 | 0.08 | | |
| Indan | 0.48 | 0.05 | 0.08 | |
| Indene | 4.53 | 0.75 | 0.01 | |
| Naphthalene | 62.40 | 3.49 | 0.20 | |
| Methylnaphthalenes | 11.75 | 11.38 | 0.20 | 0.08 |
| Quinoline | 0.77 | 0.37 | 0.34 | 0.03 |
| Acenaphthene | 0.70 | 17.68 | 8.20 | 0.44 |
| Acenaphthylene | 1.09 | 7.75 | 4.23 | 0.26 |
| Dibenzofuran | 1.29 | 0.59 | 0.43 | 0.03 |
| Fluorene | 1.85 | 10.14 | 7.53 | 0.04 |
| Phenanthrene | 1.59 | 12.70 | 26.22 | 5.23 |
| Anthracene | 0.24 | 2.90 | 4.45 | 1.46 |
| Carbazole | | 1.78 | 4.75 | 2.02 |
| 4H-Cyclopenta[def]phenanthrene | | 0.89 | 3.36 | 1.35 |
| Fluoranthene | | 1.33 | 8.66 | 15.13 |
| Pyrene | | 0.51 | 3.89 | 13.86 |
| Benz[a]anthracene | | | 0.01 | 5.29 |
| Chrysene | | | | 5.25 |
| Benzo fluoranthenes | | | | 4.84 |
| Benzo (e) pyrene | | | | 1.48 |
| Benzo (a) pyrene | | | | 1.76 |
| Boiling Point | 80-340° C. | 248-425° C. | 265-437° C. | 308->496° C. |

TABLE 2

| Component | 1st Medium distillate Soft. Pt. 115° C. (%) | 1st Medium distillate Soft. Pt. 130° C. (%) | 2nd Medium distillate Soft. Pt. 115° C. (%) | 2nd Medium distillate Soft. Pt. 130° C. (%) | Heavy distillate Soft. Pt. 115° C. (%) | Heavy distillate Soft. Pt. 130° C. (%) |
|---|---|---|---|---|---|---|
| Indene | 0,4 | 0.6 | 0,1 | | 0.1 | 0.1 |
| Naphthalene | 3.3-4.9 | 3.2-6.2 | 0.3-0.9 | 0.4-0.8 | 0.1 | 0.1 |
| Thionaphthalene | 0.1-0.3 | 0.2 | 0.1 | 0.1 | 0.1 | 0.1 |
| Quinoline | 1.4-2.2 | 1.2-1.6 | 0.4-0.6 | 0.3-0.5 | 0.1 | 0.1 |
| Isoquinoline | 0.5-0.7 | 0.4-0.6 | 0.1 | 0.1 | | |
| Indole | 1.0-1.4 | 1.0-1.2 | 0.2-0.4 | 0.3 | | |
| 2-Methylnaphthalene | 5.5-6.9 | 5.3-5.9 | 1.1-1.5 | 1.0-1.4 | 0.2 | 0.2 |
| 1-Methylnaphthalene | 2.6-3.2 | 2.4-2.8 | 0.5-0.7 | 0.5-0.7 | 0.1 | 0.1 |
| Biphenyl | 2.2-2.4 | 2.0-2.6 | 0.7 | 0.5-0.9 | 0.1 | 0.1 |
| Dimethylnaphthalenes | 2.7-3.1 | 2.5-3.1 | 0.8-1.0 | 0.7-1.1 | 0.1 | 0.2 |
| Acenaphthene | 0.3-0.5 | 0.3-0.5 | 0.1 | 0.1 | 0.1 | 0.0 |
| Acenaphthylene | 14.7-16.1 | 15.9-17.3 | 5.5-6.3 | 5.7-7.3 | 0.8-1.0 | 1.0 |
| Dibenzofuran | 7.6-8.6 | 7.3-8.7 | 3.6-4.0 | 3.3-4.5 | 0.6-0.8 | 0.8 |
| Fluorene | 9.9-10.9 | 10.5-10.7 | 5.7-6.5 | 6.0-7.0 | 1.0-1.2 | 1.3 |
| 2-Methylfluorene | 0.6-0.8 | 0.7 | 0.5-0.7 | 0.6 | 0.1 | 0.1 |
| 1-Methylfluorene | 0.3 | 0.3 | 0.3 | 0.3 | 0.1 | 0.1 |
| Dibenzothiophene | 1.4-1.6 | 1.5 | 1.6-1.8 | 1.7-1.9 | 0.5 | 0.6 |
| Phenanthrene | 19.6-22.6 | 21.4-22.0 | 25.7-30.1 | 28.2-30.8 | 7.5-8.5 | 9.0-10.0 |
| Anthracene | 5.3-5.9 | 5.6-5.8 | 6.4-8.2 | 7.9-8.9 | 2.1-2.5 | 2.5-2.9 |
| Carbazole | 2.3-3.1 | 2.2-2.8 | 4.2-5.8 | 4.9-5.5 | 1.6-2.0 | 1.9-2.1 |
| 3-Methylphenanthrene | 0.7 | 0.7 | 1.2-1.4 | 1.3 | 0.5 | 0.6 |
| 2-Methylphenanthrene | 1.0 | 0.8-1.0 | 1.7-2.1 | 1.6-2.0 | 0.7-0.9 | 0.9 |

TABLE 2-continued

| | 1st Medium distillate | | 2nd Medium distillate | | Heavy distillate | |
|---|---|---|---|---|---|---|
| Component | Soft. Pt. 115° C. (%) | Soft. Pt. 130° C. (%) | Soft. Pt. 115° C. (%) | Soft. Pt. 130° C. (%) | Soft. Pt. 115° C. (%) | Soft. Pt. 130° C. (%) |
| Cuclopenta[def]phenanthrene | 1.5-1.7 | 1.5-1.7 | 3.2-3.8 | 3.4-3.6 | 1.4-1.6 | 1.6-1.8 |
| (4 + 1)-Methylphenanthrene | 0.3 | 0.3 | 0.6-0.8 | 0.7 | 0.3 | 0.4 |
| Fluoranthene | 3.9-5.1 | 3.5-4.5 | 14.5-17.3 | 13.3-15.5 | 14.5-16.1 | 16.2-18.2 |
| Pyrene | 2.3-3.1 | 2.0-2.6 | 9.8-11.8 | 8.3-9.9 | 14.5-16.1 | 15.9-17.7 |
| Benzo[a]fluorene | 0.2 | 0.1 | 0.7-0.9 | 0.6-0.8 | 3.1-3.5 | 3.4-3.6 |
| Benzo[b]fluorene | 0.2 | 0.2 | 0.9-1.1 | 0.7-1.1 | 3.5-3.9 | 3.7-4.1 |
| Benz[a]anthracene | | | | | 8.2-8.7 | 9.1-9.7 |
| Chrysene | | | | | 7.5-8.3 | 8.2-8.8 |
| Benzo(bjk)Fluoranthene | | | | | 7.1-7.9 | 10.0-10.8 |
| B(e)P | | | | | 2.4-2.6 | 3.5-3.7 |
| B(a)P | | | | | 2.7-3.1 | 4.1-4.3 |

The residue remaining in the C3 bottoms is the desired coal tar pitch 150, the quality of which is determined by, but not limited to, its softening point, distillate percentage to 355° C., QI and toluene insoluble content. All three parameters may be controlled by the C3 bottom liquid temperature and heavy distillate 141 product rate. Preferably, the softening point of the resulting pitch 150 may be in the range of 100-140° C. and with no more than 20% QI. In addition, the ash levels in the final pitch 150 are preferably be no more than 0.4% and the distillate to 355° C. is preferably no more than 4%. This system 100 and process may produce at least about 40% pitch yield. This pitch 150 may be removed from the third column C3 along pitch outlet line 151 for storage, transport, use or sale.

Pitch production system 100 also includes a heat treatment system 300. Though the details of the heat treatment system 300 are provided more fully below and with reference to FIGS. 4A and 4B, it should be noted that the heat treatment process 300 may increase the total pitch 150 yield by 2-10% for a total of about 42-50% yield. In certain embodiments, the pitch yield may be increased to a preferable target of 44% total pitch yield. This additional pitch 150 is achieved by heat treating the distilled heavy distillate 141 at certain preselected temperatures and residence times and then introducing the heat-treated product into the third column C3 for further distillation and separation of pitch in the pitch production system 100, as shown in FIG. 2A.

The present invention also includes a second embodiment of a coal tar pitch production system 100', shown schematically in FIG. 2B. Coal tar 102 is heated to about 160-170° C. as it travels through at least one heat exchanger (not shown) in the C1 feed line 110 under pressure of about 100 psi. The coal tar 102 is flashed into a first column C1 through an orifice 111 where the C1 feed line 110 meets the first column C1 in fluid communication. The first column C1 is a dehydrator in this embodiment under atmospheric pressure of about 900 mm Hg (17.4 psia). The pressure difference between the C1 feed line 110 and the first column C1 flashes the wet coal tar 102 and separates the water vapor and light oils, such as benzene, toluene and xylene, as C1 distillate 112. As before, the residue remaining in the first column C1 bottoms is dry tar 114, which resides in the first column C1 until the dry tar 114 has no more than about 2.5% water content, and preferably no more than 0.5%. It may be similarly characterized as the dry tar 114 described above.

The dry tar 114 is transferred through C1-C2 transfer line 115 to a second column C2 which may be a fractionator or multi-stage distillation column as described above. Here, the second column C2 may be under vacuum at pressure of about 120-180 mm Hg (2.3-3.48 psia) and may be heated to an internal temperature of about 182-230° C. In this second embodiment of the production system 100', light distillate 122' distills and is collected by distillate line 123. The light distillate 122' may have a composition and be characterized as shown in Table 3 below. A medium distillate 138' is also distilled and removed from the second column C2. The medium distillate 138' may have a composition and be characterized as shown in Table 3 below. The C2 bottoms are heated with a heater (not shown) to temperatures of about 350-365° C. to circulate the residue and assist in distillation. The distilled light and medium distillate 122', 138' may be combined and stored together, or may be separately stored and later processed, such as to produce refined creosote which can be sold or used for other applications.

The C2 bottoms contain the topped tar 125', which may have similar characteristics as those described previously, and may be at temperatures of about 350-365° C. and pressures of about 180-220 mm Hg (3.48-4.25 psia). In this second embodiment of the pitch production process 100', however, the topped tar 125' is transferred from the second column C2 to a fourth column. C4 through C2-C4 transfer line 126'. The fourth column C4 is a flash column, rather than the fractionator third column C3 described above. The topped tar 125' may be flashed into the fourth column C4 through an orifice 111 such as a sparger or other suitable introduction opening. The fourth column C4 may be under vacuum at a pressure of about 40-70 mm Hg (0.77-1.35 psia). When the topped tar 125 flashes into the fourth column C4, heavy distillate 141' separates out at temperatures of about 290-365° C. and may be removed through distillate line 142. This heavy distillate 141' includes the composition and may be characterized as shown in Table 3 below. The heavy distillate 141' is then transferred to the heat treatment system 300 described below for heat treatment to increase pitch production. Once through the heat treatment system 300, the heat-treated product is introduced into the C1-C2 transfer line 115 to be added to the C2 feedstock for additional fractionation and distillation. The pitch 150' produced through this process has increased yields of 20-40% more than the original yield percentage without heat treatment of the heavy distillate 141'.

The various distillates produced by the second preferred embodiment of the pitch production system may be characterized as in Table 3.

TABLE 3

| Component | Light distillate (% total) | Medium distillate (% total) | Heavy distillate (% total) |
|---|---|---|---|
| Benzene | 0.16 | | |
| Toluene | 0.17 | | |
| Ethylbenzene | 0.07 | | |
| m+p Xylene | 0.32 | | |
| Styrene | 0.23 | | |
| o Xylene | 0.13 | | |
| 3+4 Ethyl toluene | 0.00 | | |
| 1,3,5 Trimethyl benzene | 0.00 | | |
| Phenol | 0.12 | | |
| 1,2,3 Triethyl benzene | 0.00 | | |
| Indan | 1.45 | 0.07 | |
| Indene | 3.21 | 0.22 | |
| Naphthalene | 53.76 | 12.86 | |
| Methylnaphthalenes | 7.58 | 0.90 | |
| Quinoline | 0.61 | 5.16 | |
| Acenaphthene | 3.79 | 0.63 | 2.35 |
| Acenaphthylene | 1.36 | 1.96 | 0.07 |
| Dibenzofuran | 2.26 | 3.71 | 0.29 |
| Fluorene | 2.88 | 17.03 | 0.83 |
| Phenanthrene | 4.43 | 2.91 | 9.77 |
| Anthracene | 0.97 | 1.62 | 3.19 |
| Carbazole | | 1.61 | 18.3 |
| 4H-Cyclopenta[def]phenanthrene | | 2.00 | 2.00 |
| Fluoranthene | | 11.56 | 16.23 |
| Pyrene | | 8.03 | 14.74 |
| Benz[a]anthracene | | 0.50 | 4.71 |
| Chrysene | | 1.76 | 4.98 |
| Benzo fluoranthenes | | 0.82 | 4.09 |
| Benzo (e) pyrene | | 0.39 | 1.16 |
| benzo (a) pyrene | | 0.62 | 1.46 |
| Boiling Point | 80-340° C. | 265->496° C. | 279->496° C. |

In a third embodiment of the pitch production system 100", shown in FIG. 2C, coal tar 102 is heated to about 124-184° C. as it travels through at least one heat exchanger (not shown) in the C1 feed line 110 under pressure of about 158-161 psi. The coal tar 102 is flashed into a first column C1 through an orifice 111 where the C1 feed line 110 meets the first column C1 in fluid communication. The first column C1 is a dehydrator in this embodiment under atmospheric pressure of about 15.6 psia. The pressure difference between the C1 feed line 110 and the first column C1 flashes the wet coal tar 102 and separates the water vapor and light oils, such as BTX as C1 distillate 112, having temperatures of about 115° C., As before, the residue remaining in the first column C1 bottoms is dry tar 114, which resides in the first column C1 until the dry tar 114 has no more than 2.5% water content, preferably no more than about 0.5% water, and temperature of about 230° C. It may be similarly characterized as the dry tar 114 described above.

This third embodiment of the system 100" differs from the previous embodiments in that it utilizes four columns for distillation and separation of oils in pitch formation. Specifically, the dry tar 114 is transferred to a second column C2 which is a fractionator through C1-C2 transfer line 115 and may be heated to temperatures of about 262° C. by a heater (not shown). Light distillate 122" are distilled off from this second column C2 and may be refluxed for further separation. The light distillate 122" may be characterized as shown in Table 4 below and may include RCO and other light oils. The resulting topped tar 125" formed at the bottom of second column C2 may be transferred to third column C3 through C2-C3 transfer line 126 for further distillation.

In third column C3, the tar may be heated to temperatures of about 330° C. by a heater (not shown) to distill medium distillate 138". These medium distillate 138" may be characterized as shown in Table 4 below and may include creosote and certain carbon black feed compounds. The medium distillate 138" may also be refluxed through third column C3 for further distillation and separation. The resulting soft pitch 127" formed in the bottom of the third column C3 may be close to the desired pitch but may have too low a softening point, such as in the range of about 90° C. The increase the softening point of the pitch, further oils must still be removed.

Accordingly, the soft pitch 127" may be transferred through C3-C4 transfer line to the fourth column C4, which may be a flash column relying on pressure differential to remove the oils from the solids. For instance, the fourth column C4 may be under a vacuum of about 1 psia. The pressure differential causes the heavy distillate 141" to distill off, leaving the desired coal tar pitch 150" in the bottom of the fourth column, which may be removed for further use or sale. The heavy distillate 141" may be at a temperature of about 310° C. and pressure of about 1 psi(g) and may further be characterized as shown in Table 4 below.

The process 100" continues with heat treatment of the distilled heavy distillate 141" through a heat treatment system 300 and described in greater detail below. Once heat treated, the heavy distillate 141" is joined with topped tar 125" as C3 feedstock or separately introduced to third column C3 for distillation of the medium distillate 138" and then later heavy distillate 141" from the newly generated additional pitch.

The distillates produced by the third preferred embodiment of the coal tar pitch production system 100" may be characterized as in Table 4.

TABLE 4

| Component | Light distillate (% total) | Medium distillate (% total) | Heavy distillate (% total) |
|---|---|---|---|
| Benzene | | | |
| Toluene | | | |
| Ethylbenzene | 0-0.58 | 0-0.55 | |
| m+p Xylene | | | |
| Styrene | 0-0.43 | 0-0.32 | |
| o Xylene | | | |
| 3+4 Ethyl toluene | | | |
| 1,3,5 Trimethyl benzene | 0-1.23 | 0-0.58 | |
| Phenol | | | |
| 1,2,3 Triethyl benzene | | | |
| Indan | 0.55-0.74 | 0-0.29 | |
| Indene | 6.45-6.58 | 3.00-4.28 | 0-0.28 |
| Naphthalene | 47.89-56.51 | 3.48-6.00 | |
| Methylnaphthalenes | 6.56-11.19 | 1.32-5.00 | |
| Quinoline | 0-1.47 | | |
| Acenaphthene | 2.12-3.88 | 6.00-6.71 | 2.01-4.41 |
| Acenaphthylene | 1.71-2.16 | 0-3.00 | 0-2.00 |
| Dibenzofuran | 1.50-3.69 | 2.50-3.38 | 0.16-0.53 |
| Fluorene | 0.71-2.85 | 4.81-5.00 | 0.78-1.73 |
| Phenanthrene | 0.04-0.96 | 17.00-17.11 | 6.51-12.81 |
| Anthracene | | 1.55-3.00 | 2.25-4.18 |
| Carbazole | | 1.49-3.00 | 1.39-3.24 |
| 4H-Cyclopenta[def]phenanthrene | | 0-2.17 | 0-1.92 |
| Fluoranthene | | 10.00-13.60 | 14.82-18.35 |
| Pyrene | | 10.00-10.93 | 13.51-19.27 |
| Benz[a]anthracene | | 2.50-2.53 | 5.18-5.46 |
| Chrysene | | 1.29-1.50 | 4.56-5.85 |
| Benzo fluoranthenes | | 0.50-1.47 | 3.72-3.93 |
| Benzo (e) pyrene | | 0.41-0.50 | 1.02-1.20 |
| benzo (a) pyrene | | 0.50-0.56 | 1.36-1.54 |
| Boiling Point | 170-336° C. | 265->496° C. | 308->496° C. |

Petroleum Pitch

Petroleum products may be used as a starting material to generate petroleum pitch 250, as shown in FIGS. 3A-3C. For instance, as shown in FIG. 3A, a petroleum distillate such as decant oil is generally identified as oil 203 and is used as the starting product for pitch production. Decant oil 203 is the mixture of heavy oils obtained from the catalytic cracking of petroleum. It is similar in many ways to coal tar 102 but differs in that it includes more aliphatic hydrocarbons from the petroleum, which makes the chemistry of processing the decant oil 203 more complex. However, many of the steps are similar. In certain embodiments, ECB may be used as the oil 203 for pitch production 200, either independently or in combination with decant oil. However, ECB is less stable, particularly as a vapor and may be prone to explosion, making it more difficult to reliably work with as a starting reagent. ECB is also not generally appropriate for manufacture of impregnation pitches. Decant oil is very shelf stable and easy to work with and may therefore be preferred in at least one embodiment. The petroleum pitch production systems 200, 200', 200" will be described in terms of using decant oil 203 as the starting material, but it should be appreciated that any heavy oil or composition thereof from cracking of petroleum (catalytically or otherwise) which has the proper characteristics of sulfur content, carbon content or coking value may be used as the starting material.

The dehydration and distillation portions of the petroleum pitch production system 200, 200', 200", shown in FIGS. 3A-3C and FIGS. 3D-3F, may be similar to those of the coal tar production systems 100, 100', 100" of FIGS. 2A-2C, respectively. However, the petroleum pitch production systems 200, 200', 200" may differ in operating parameters at each step. To the extent not specifically identified as distinct, it should be noted by those skilled in the art that the operating parameters for coal tar may be equally applied for petroleum. In addition, the heat treatment process 300, 300' may occur as the first step in the process, before dehydrating and distilling the starting material, when creating petroleum pitch 250, as shown in FIGS. 3A-3C, whereas it occurs after dehydrating and distilling the starting material when creating coal tar pitch 150. This is primarily because of the chemical composition of the decant oil which lacks heavier components as compared to coal tar and having a generally lower water content upon delivery. As such, the decant oil distillation byproducts are generally unsuitable for independent heat treatment. Therefore, the input of the heat treatment system 300, 300' in the petroleum pitch production systems 200, 200', 200" is decant oil 203. These heat treatment systems 300, 300' are described below in greater detail and with reference to FIGS. 4A and 4B and may be the same as those used in the production of coal tar pitch 150, 150', 150".

Figure 3D:
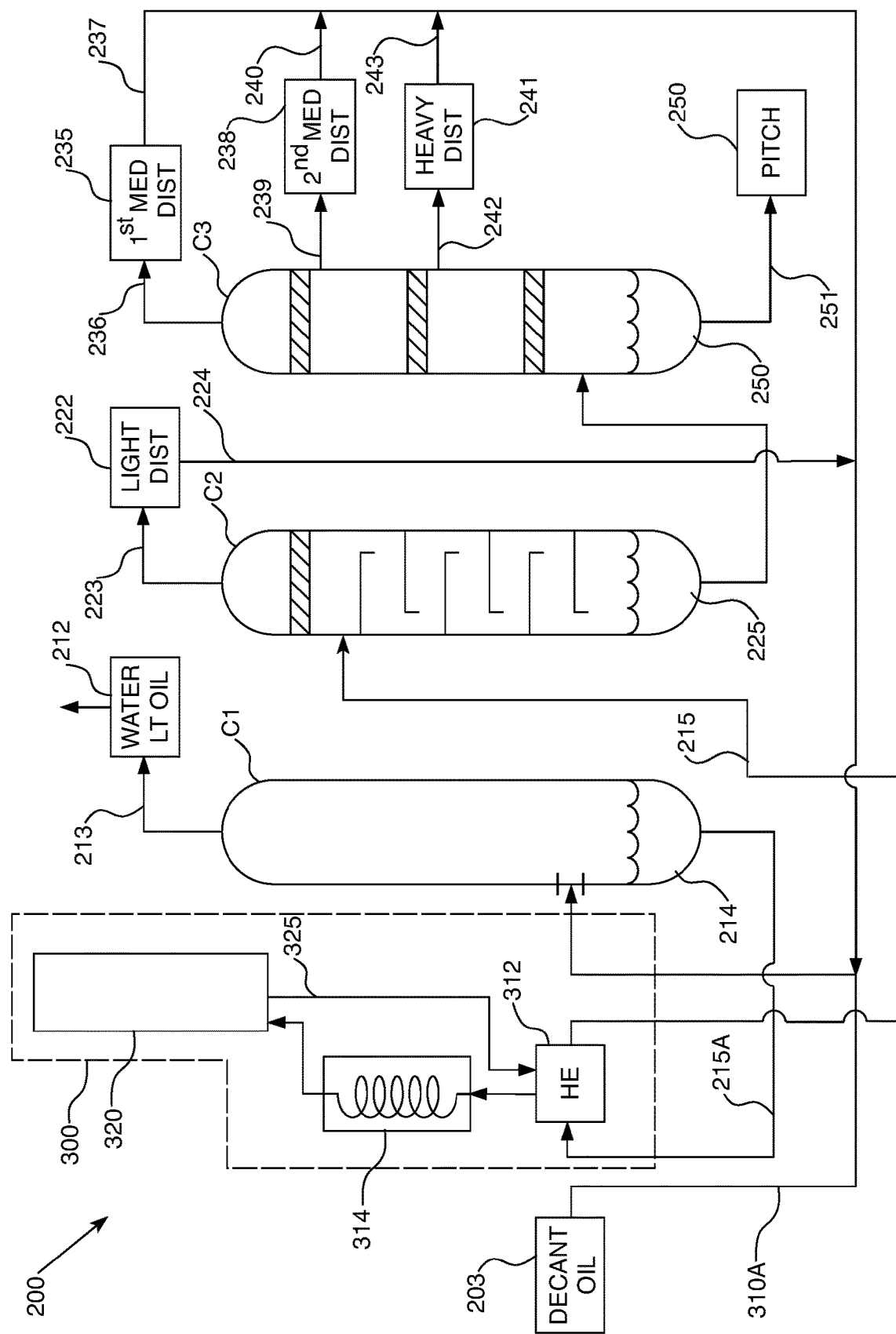
FIG. 3D is a schematic diagram of a fourth embodiment of the pitch production system of the present invention incorporating heat treatment for producing increased yields of pitch from petroleum byproducts such as decant oil.
Figure 3E:
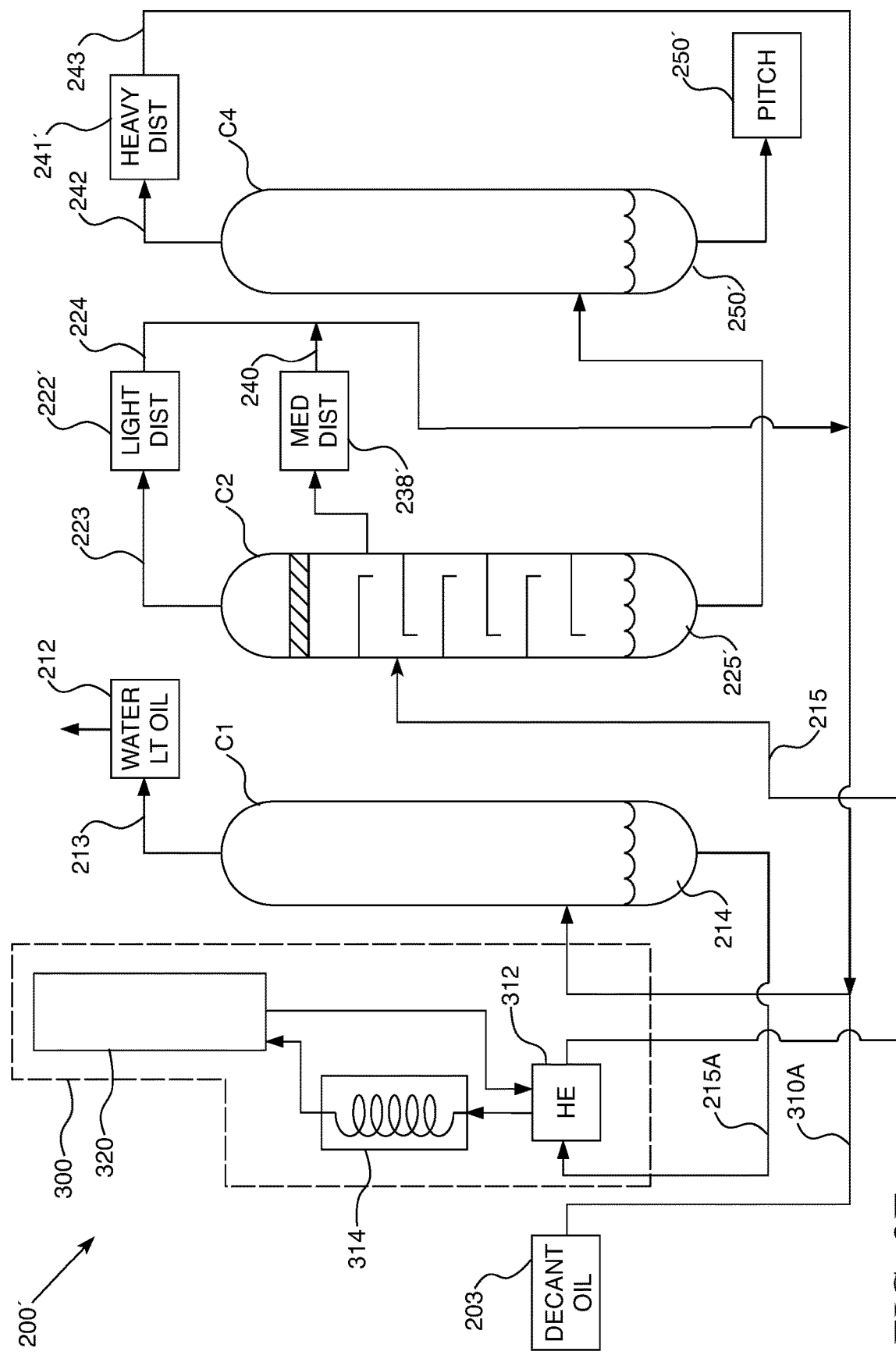
FIG. 3E is a schematic diagram of a fifth embodiment of the pitch production system of the present invention incorporating heat treatment for producing increased yields of pitch from petroleum.
Figure 3F:
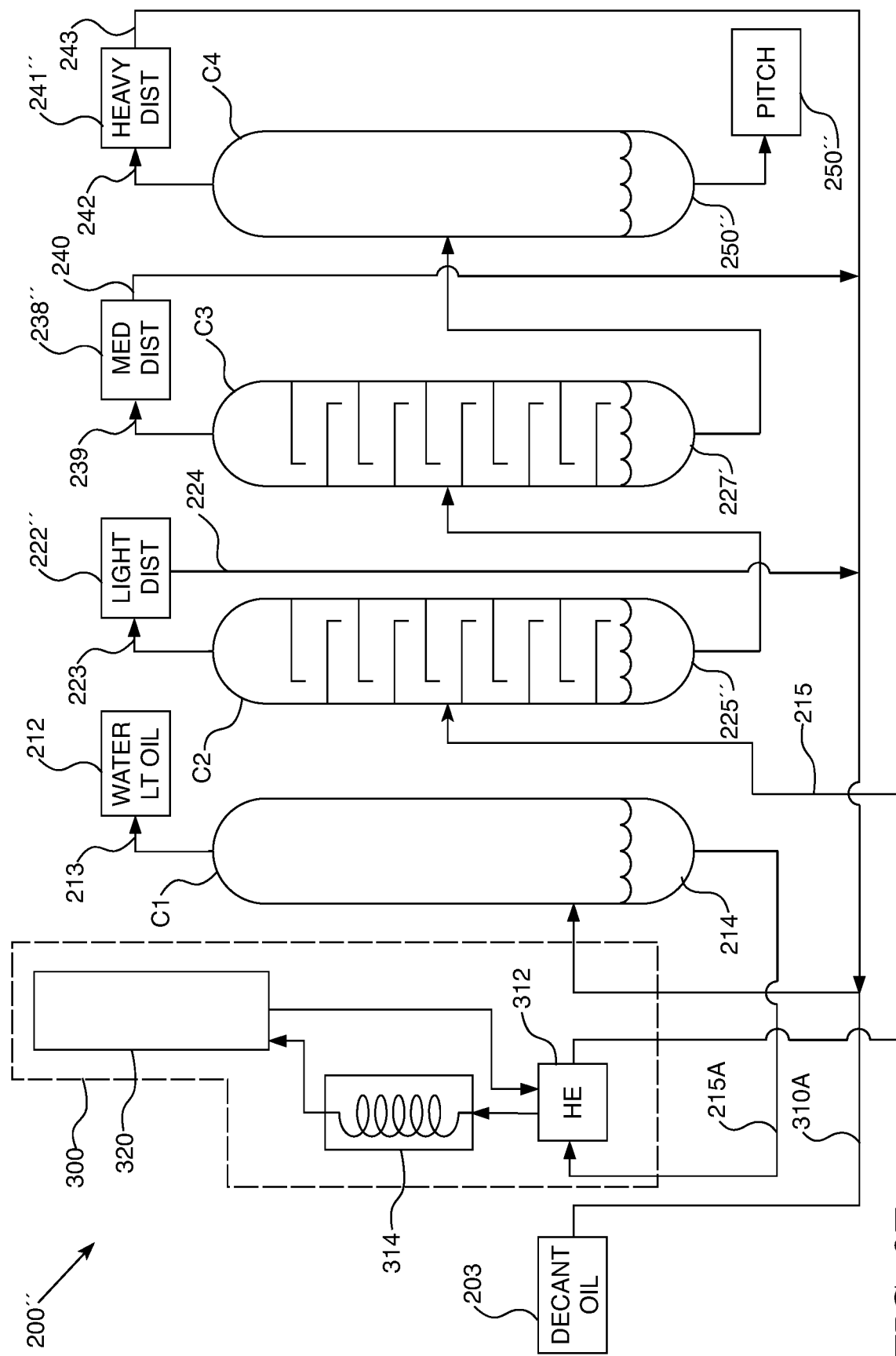
FIG. 3F is a schematic diagram of a sixth embodiment of the pitch production system of the present invention incorporating heat treatment for producing increased yields of pitch from petroleum.

With reference to FIG. 3A, in a first embodiment of the pitch production system 200, decant oil 203 is initially processed through a heat treatment system 300, then directed to the remaining distillation system, with a particular process path being determined by batch or continuous processing and water content. To the extent the decant oil 203 does not require dehydration, the C1 dehydrator as discussed below with respect to FIGS. 3A-3C may be eliminated and streams 326' and 215 would be combined, as would be within knowledge of one skilled in the art. To the extent the C1 dehydrator is necessary, or potentially as part of a continuous process, decant oil 203 or the combined light distillate 222, first medium distillate 235, second medium distillate 238, heavy distillate 241 or any combination or sub-combination thereof may be reintroduced to the heat treatment system 300 or the C1 dehydrator, as discussed more fully below. If so, as shown in FIGS. 3D-3F, decant oil 203 may alternatively be directed to C1 dehydrator through input stream 310A. After dehydration, as discussed below, it may be returned for heat treatment through output stream 215A for introduction to the heat treatment system 300. Moreover, as part of a continuous system, distillate stream 243 may be returned for reintroduction to the first column C1 dehydrator through input stream 310A. In embodiments utilizing dehydrator C1, material is introduced and flashed into first column C1 dehydrator. The pressure differential between incoming heat-treated oil and first column C1 cause light oils such as naptha or BTX (benzene, toluene and xylene) to separate from the remainder of the decant oil 203, which are removed as C1 distillate 212 through distillate line 213. It should also be specifically noted that BTX and other light oils may be extracted from the reactor 320, as will be described below in more detail.

The remaining dry oil 214 is transferred to a fractionator second column C2 through C1-C2 transfer line 215 or returned for heat treatment as discussed above. This second column C2 is heated to temperatures of about 350-365° C. by a heater as before to distill off light distillate 222 from the oil, which may include RCO and creosote. The light distillate 222 may also be directed for recycling through the system 200 for further heat treatment and distillation through light distillate stream 224.

The residue in the C2 bottoms comprises topped heat-treated oil 225 which is transferred to heat exchangers to raise the temperature of the topped oil 225 to about 375-415° C. before entering a third column C3 where it is further distilled. As the topped oil 225 is distilled, various distillates may be removed to form the petroleum pitch 250. Specifically, a first medium distillate 235 may be distilled first corresponding to carbon black feed and other components. A second medium distillate 238 may be extracted and include slightly heavier molecules. Heavy distillate 241 may be distilled last having the heaviest oils and components. Each of these distillates may be combined in various combinations and directed for recycling through the system 200 for further heat treatment and distillation through first medium distillate stream 237, second medium distillate stream 240 and heavy distillate stream 243, respectively. As discussed below, it is noted that pitch 250 must be removed prior to any recycling through heat treatment. As can be appreciated from FIG. 3A, all the various distillate streams 224, 237, 240 and 243 may be combined in any combination or sub-combination to form a single input for joining with fresh decant oil 203 entering the heat treatment system 300 at the beginning of the pitch production process 200 or be introduced to C1 dehydrator as necessary. However, it is also contemplated that the various distillate streams 224, 237, 240 and 243 may be separately supplied to the heat treatment system 300 for recycling.

A second embodiment of the pitch production system 200', shown in FIG. 3B, is very similar but differs in the distillation procedure. Specifically, the light distillate 222' and medium distillate 238' may both be distilled in the second column C2 which is heated to temperatures of 350-415° C. The resulting topped oil 225' is then transferred to a fourth column C4 which is a flash column as previously described. The heavy distillate 241' is distilled in this fourth column C4 to form the resulting petroleum pitch 250'. Each of the light distillate 222', medium distillate 238' and heavy distillate 241' may be directed for recycling through the system 200' for further heat treatment and distillation of light distillate stream 224, medium distillate stream 240 and heavy distillate stream 243, respectively, which may be combined for reentry into the heat treatment system 300 or may be input separately.

A third embodiment of the pitch production system 200", shown in FIG. 3C, is similar as well but differs in that it utilizes four columns in the dehydration and distillation process. Here, the light distillate 222" is removed in the second column C2 fractionator in creating topped oil 225", the medium distillate 238" is removed from the third column C3 fractionator in creating soft pitch 227' and the heavy distillate 241" is removed from the fourth column C4 flash column in creating the final petroleum pitch 250". Each of light distillate 222", medium distillate 238" and heavy distillate 241" may be directed for recycling through the system 200" for further heat treatment and distillation through light distillate stream 224, medium distillate stream 240 and heavy distillate stream 243, respectively, which may be combined for reentry into the heat treatment system 300 or may be input separately.

In a preferred embodiment, the light distillate 222', medium distillate 238' and heavy distillate 241' as derived from the second embodiment of the petroleum pitch production system 200' may be characterized as shown in Table 5 below, although distillates derived from other embodiments may also be similar.

TABLE 5

| Component | Light distillate (% total) | Medium distillate (% total) | Heavy distillate (% total) |
|---|---|---|---|
| Benzene | 0.88 | | |
| Toluene | 1.00 | | |
| Ethylbenzene | 1.73 | | |
| m+p Xylene | 4.00 | | |
| Styrene | 1.64 | | |
| o Xylene | 5.81 | | |
| 3+4 Ethyl toluene | 1.65 | 0.20 | |
| 1,3,5 Trimethyl benzene | 4.88 | 0.23 | |
| Phenol | 1.35 | 0.17 | |
| 1,2,3 Triethyl benzene | 5.22 | 0.08 | |
| Indan | 0.53 | 0.09 | |
| Indene | 0.50 | 0.14 | |
| Naphthalene | 0.63 | 0.90 | 0.09 |
| Methylnaphthalenes | 1.50 | 5.06 | 0.61 |
| Quinoline | 0.07 | 0.26 | 0.40 |
| Acenaphthene | 0.04 | 0.87 | 0.14 |
| Acenaphthylene | 0.03 | 1.32 | 0.15 |
| Dibenzofuran | 0.05 | 1.32 | 0.18 |
| Fluorene | 0.06 | 1.00 | 0.11 |
| Phenanthrene | | 1.73 | 1.68 |
| Anthracene | | 0.47 | 0.46 |
| Carbazole | | 0.37 | 0.30 |
| 4H-Cyclopenta[def]phenanthrene | | 0.46 | 1.35 |
| Fluoranthene | | 1.00 | 1.43 |
| Pyrene | | 1.57 | 6.92 |
| Benz[a]anthracene | | 0.20 | 1.47 |
| Chrysene | | 0.05 | 2.35 |
| Benzo fluoranthenes | | 0.17 | 0.26 |
| Benzo (e) pyrene | | | 0.11 |
| Benzo (a) pyrene | | | 0.04 |
| Boiling Point | >80-340° C. | 160-425° C. | 218-495° C. |

Heat Treatment

The present invention also includes heat treatment systems 300, 300' for heating the distillates from coal tar pitch production 100, 100', 100" or the starting decant oil for petroleum pitch production 200, 200', 200". Each of the heat treatment systems 300, 300' utilizes specific temperatures and retention times to enrich the heat-treated material for producing additional pitch that would not be generated absent the heat treatment process, thereby increasing total pitch production yields. It is to be specifically noted that these systems are interchangeable by design and constitute substitutable embodiments in any of the systems described herein.

FIG. 4A depicts a first embodiment of the heat treatment system 300. Input to the system 300 is from the pitch production system, such as heavy distillate 141 from coal tar pitch production 100, decant oil 203 or a combination of light distillate 222, medium distillate 238 (or first and second medium distillate 235, 238) and heavy distillate 241 from petroleum pitch production 200. Regardless of type, the input enters the heat treatment system 300 through heat treatment input stream 310. This input material may be at a temperature in the range of 265-300° C., moving at flow rates of about 4-9 MT/h and at pressures of about 3.3-7.5 bar(g) (47.86-108.78 psi(g)); more preferably at temperatures in the range of 273-293° C., flow rates of about 5.5-9 MT/h and pressures of about 3.5-6.5 bar(g) (50.76-94.27 psi(g)); still more preferably at temperatures of about 278-288° C., flow rates of about 6.5-9 MT/h and pressures of about 3.8-5.5 bar(g) (55.11-79.77 psi(g)); and most preferably at a temperature of about 283° C., flow rate of about 7 MT/h and pressure of about 4.5 bar(g) (65.27 psi(g)). It is to be specifically noted that disclosed flow rates are not intended as a process limitation. Increased flow rates beyond the described ranges merely require recalculation of the remaining variables in accordance with the specification. The heat treatment input stream 310 may be a pipe or other conduit of about 2 inches (50.8 mm) in diameter. A pump 311, such as but not limited to a pressure pump, may be implemented in the heat treatment input stream 310 to move the input material therethrough and pressurize it up to pressures of about 6.2-11.7 bar(g) (89.92-169.69 psi(g)), more preferably to pressures of about 7.2-9.7 bar(g) (104.42-140.69 psi(g)), still more preferably to pressures of about 7.5-8.7 bar(g) (108.78-126.18 psi(g)), and most preferably to a pressure of about 8.8 bar(g) (127.63 psi(g)). The heat treatment input stream 310 routes the input material to a heat exchanger 312 which raises the temperature of the input material to about 455-490° C., more preferably to about 470-490° C., still more preferably to about 475-490° C., and most preferably to about 480° C. From the heat exchanger 312, the input material is moved through a line 313 (which may be heated) to process heater 314 preferably having turbulent flow therein. This process heater 314 may be, any type of thermal reactor, such as but not limited to induction heated. For example, in at least one embodiment, the process heater 314 may include a soaking coil 315 constructed of a heat conductive material to facilitate heat transfer, soaking coil 315 being in fluid communication with the line 313. It is to be understood that "heat conductive" is intended to mean a material which transfers heat or facilitates the transfer of heat and not any particular heating mechanism or regime. While not required, turbulent flow of the input stream of material is strongly desirable within process heater 314. There may be at least one source 316, such as providing alternating current (AC), direct current (DC) or other type of work, power or energy to the process heater 314 to heat the thermal coil 315. It is to be specifically noted that the application of heat energy may be of any known type, including inductive heating, flame, molten materials such as salt or metal, electric coil or otherwise. The only constraint is the application of the heat in the amounts specified. The input material is brought to temperatures of about 475-510° C. and pressures of about 4.2-11.7 bar(g) (60.92-169.69 psi(g)), more preferably about 490-510° C. at about 5.2-9.7 bar(g) (75.42-140.69 psi(g)), still more preferably about 495-510° C. at about 5.5-8.7 bar(g) (79.77-126.18 psi(g)), and most preferably about 500° C. at about 6.8 bar(g) (98.63 psi(g)) as it traverses through the coil 315 and the process heater 314.

The heated material exits the process heater 314 through reactor output line 317 and moves to a reactor 320. The reactor output line 317 may be of smaller diameter than the previous input stream 310, such as about ⅝ inch (31.75 mm) for a high velocity or turbulent transfer. The reactor 320 may include a plurality of vessels, pipes or conduits through which the heated material passes to achieve the desired retention or residence time in the system 300 for heat treatment. Accordingly, the reactor 320 may comprise a variety of lengths, shapes, dimensions and arrangements as would be known to those skilled in the art to achieve the desired retention time. Without being bound by theory, the heated material is introduced to reactor 320 and passed therethrough as a continuous stream which generally moves at a uniform or near-uniform plug flow and velocity, within the limits of conventional piping or reservoir flow characteristics. Preferably, however, in an elongated vessel, the length to diameter ratio is about 10:1.

For instance, in at least this first embodiment, the reactor output line 317 is in fluid communication with a first vessel 321, delivering the heated material into the first vessel 321. Because the heated material is at a high temperature, the interior volume of the first vessel 321 is under inert gas 318 such as but not limited to nitrogen or argon gas, to keep oxygen from the first vessel 321. The first vessel 321 may have a variety of shapes and/or diameters as discussed above, and in at least one embodiment may be elongate in length of about 16 m and have a diameter of about 14 inches (0.3 m). It may also be insulated to conserve the heat of the heated material to maintain the temperature at about 500° C. The first vessel 321 is also under pressure at about 6-7 bar (87-101.5 psi(g)), which collectively with the temperature operates to keep the heated material in liquid phase so it moves easily through the system 300. While true adiabatic conditions are practically impossible, it is intended that the temperature in first vessel 321 (as well as corresponding segments of any other embodiment including a singular vessel embodiment which is specifically contemplated) remain at a near constant level for a substantial portion of the traverse of the heated material therethrough which will be arbitrarily identified as "near-constant temperatures." Fluctuations of plus or minus 30° C. and more preferably plus or minus 10° C. and most preferably plus or minus 5° C. will be considered near uniform for the purposes of this preferred embodiment. Moreover, it is intended that, within the bounds of practicality, that the heated material traverse the vessel as uniformly as possible in near-uniform flow.

The heated material enters the first vessel 321 from the bottom and proceeds to rise in level as additional heated material is delivered to the first vessel 321. The heated material essentially moves by plug flow through the first vessel 321 such that the molecules of heated material all move at as near the same rate as is possible through the first vessel 321. It is to be understood that while comprehensive plug flow is unlikely to be achieved in light of the mechanics of fluid interaction with the interior surface of the vessel, the design of the vessel and the reactor 320 as a whole is to achieve as near-uniform flow as possible. Current or variations in flow rate within the first vessel 321 is to be avoided. This is to keep all the molecules of heated material moving at as uniform of a rate as is possible through the reactor 320 so the residence time of the molecules can be known. The longer the residence time, the longer the molecules of heated material are subjected to a given reaction temperature and the higher the risk of mesophase formation that may lead to coke formation. Turbulence is therefore useful to create near-uniform plug flow but not to the degree that would cause some molecules to move more rapidly while catching others in eddies or localized recirculation. The inconsistencies caused by excessive turbulence are believed to lead to inconsistencies in the heat treatment process 300 and therefore be detrimental to the quality of additional pitch 150, 250 formed thereby.

As the heated material rises through the first vessel 321, vapors containing light chains 322 will form ahead of the liquid. These light chains 322 may include small lengths of carbon chain molecules that failed to combine with other molecules or broke off as byproducts during pitch formation. These light chains 322 may be removed from the first vessel 321 and collected for further processing, such as by scrubbing or other collection for any non-condensable gasses. Without being bound by theory, it is believed that this vapor material aids in the uniformity of flow through the vessel. When the heated material level rises to a predefined outlet point in the first vessel 321, it may flow into an interim reactor line 323 that is in fluid communication with the first vessel 321 and a second vessel 324. The interim reactor line 323 may be smaller or of similar size than the first or second vessels 321, 323. In at least one embodiment, the interim reactor line 323 may be about 3 inches (76.2 mm) in diameter and preferably be a maximum of one-fifth of the diameter of first vessel 321. It transfers the heated material from the first vessel 321 to the second vessel 324 for further retention.

In at least one embodiment, the second vessel 324 may be a stand pipe or other similar elongate structure having a diameter of about 6 inches (0.15 m) and a length of about 5 m. It should be minimally sized to retard further reaction and be insulated to conserve the heat of the material to maintain a temperature around 500° C. The heated material also moves by near-uniform or plug flow, as described above, which are used interchangeably here, through the second vessel 324. A reactor output line 325 is in fluid communication with the second vessel 324 and transfers the heated material from the second vessel 324 to the heat exchanger 312. This may be the same heat exchanger 312 as described above, or may be a different heat exchanger, through preferably it is the same. The reactor output line 325 may be of a similar diameter as the reactor output line 317, such as about 1.25 inches (31.75 mm) for high velocity transfer. The heated material exiting the reactor 320 and returning to the heat exchanger 312 may have lost some heat during its trip through the reactor 320, now having a temperature of about 465-510° C., more preferably about 480-510° C., still more preferably about 485-510° C., and most preferably about 490° C. At this point, the heated material is cooled in heat exchanger 312 and slightly reduced in pressure to temperatures of about 275-325° C. and pressures of about 3.7-11.7 bar(g) (53.66-169.69 psi(g)), more preferably about 280-315° C. and 5.2-9.7 bar(g) (75.42-140.69 psi(g)), still more preferably about 288-305° C. and 5.0-8.7 bar(g) (72.52-126.18 psi(g)), and most preferably about 300° C. and 6.5 bar(g) (94.27 psi(g)). This heat-treated material includes additional pitch formed by the exposure to the heat treatment. To obtain this additional pitch, the heat-treated material is carried away from the heat exchanger 312 by an output line 326 which intersects at various positions in the pitch production systems 100, 100', 100", 200', 200', 200" depending on the embodiment and type of system to deliver the heat-treated product for distillation and removal of oils to extract the additional pitch. Specifically, the output line 326 may intersect with the C2-C3 transfer line 126 of coal tar pitch production systems 100 and 100", as shown in FIGS. 2A and 2C respectively, to be additional C3 feedstock; into C1-C2 transfer line 115 of coal tar pitch production system 100', shown in FIG. 2B, to be additional C2 feedstock; and directly into first column C1 in petroleum pitch production systems 200, 200', 200", shown in FIGS. 3A-3C, to be dehydrated and later distilled. Other embodiments may introduce the heat-treated product at different points along the pitch production systems. The combining of heat-treated material with topped tar 125, 125" or dry tar 114 in coal tar embodiments may lower the temperature, flow rate and pressure further such that the C3 feedstock or C2 feedstock, respectively, may be about 358-375° C. at flow rates of about 98-130 m³/h and pressures of about 2.3-5.5 bar(g) (33.35-79.77 psi(g)), more preferably about 362-373° C. at about 99-120 m³/h and about 2.5-4.9 bar(g) (36.26-71.07 psi(g)), still more preferably about 364-370° C. at about 99-110 m³/h and about 2.8-4.5 bar(g) (40.61-65.27 psi(g)), and most preferably about 367° C. at about 99 m³/h and about 3.5 bar(g) (50.76 psi(g)). It is to be specifically noted that in any continuous process, that the pitch formed by the heat treatment must be separated from the other oils contained in the heat treated material prior to reintroduction of those remaining other oils to the heat treatment system for additional processing and additional pitch formation. Without being bound by theory, it is generally undesirable to heat treat pitch material as the likelihood of forming mesophase or coke is high upon additional heat treatment and therefore the pitch should be separated by distillation prior to any reintroduction to heat treatment.

The residence time of the heated material in the heat treatment system 300, which may interchangeably be referred to as "residence time" or "retention time," is the duration of the heat treatment process and may be defined as the time it takes the heated material to make the circuit from the heat exchanger 312, through the reactor 320 and return to the heat exchanger 312 for cooling. This circuit defines the time in which the heated material is subjected to elevated temperatures of about 500° C. and therefore in which care must be taken to avoid mesophase formation. The residence time may vary depending on the precise temperature and pressure of the system, with higher temperatures or pressures corresponding to lower residence times. In at least one embodiment, the heat treatment system 300 includes heating the input material at temperatures of about 500° C. and pressures of about 87-101.5 psi(g) for about 3-7 minutes, preferably 7 minutes.

The various distillate fractions from the pitch production systems 100, 100', 100" are fairly-well defined and characterized as described above. Therefore, the consistency of the coal tar starting material, heavy distillate 141, means the retention time and reaction temperatures can be relatively predictable, though the specific relationship between the various parameters is somewhat complex. The following are some exemplary ranges of operative parameters of the heat treatment process of heavy distillate:

TABLE 6

| Parameter | Broadest Range | Preferred Range | Most Preferred Range | Target |
|---|---|---|---|---|
| Temperature [° C.] | 475-510 | 490-510 | 495-510 | 500 |
| Pressure [psi(g)] | 46.2 at 490° C. 155 at 510° C. | 60.7 at 490° C. 126 at 510° C. | 65.1 at 495° C. 111.5 at 510° C. | 83.9 |
| Retention Time [min] | 49.2 at 475° C. 3.0 at 510° C. | 23.6 at 490° C. 4.3 at 510° C. | 16.3 at 495° C. 5.7 at 510° C. | 7.4 at 500° C. |
| Pitch Yield [%] | 45   15 | 40   20 | 35   25 | 30 |

Additional calculations of parameters for estimated pitch yields at various flow rates for the heat treatment of coal tar heavy distillate are shown in the following Table 7, which rely the same complex relationship noted above.

TABLE 7

| Flow rate [lp/h] | Temperature [° C.] | Pressure [psi(g)] | Pitch yield est. [%] | Retention time [min] |
|---|---|---|---|---|
| 1250 | 470 | >50 | 22.7 | 16.4 |
|  | 475 | >54 | 25.6 | 16.3 |
|  | 480 | >60 | 28.8 | 16.2 |
|  | 485 | >63 | 32.3 | 16.1 |
|  | 490 | >66 | 36.2 | 16.0 |
|  | 495 | >71 | 40.3 | 15.9 |
|  | 500 | >74 | 44.6 | 15.8 |
|  | 505 | >83 | 48.8 | 15.7 |
| 1000 | 470 | >50 | 26.3 | 20.5 |
|  | 475 | >55 | 29.6 | 20.4 |
|  | 480 | >60 | 33.2 | 20.3 |
|  | 485 | >63 | 37.1 | 20.1 |
|  | 490 | >66 | 41.3 | 20.0 |
|  | 495 | >71 | 45.5 | 19.8 |
|  | 500 | >74 | 49.9 | 19.7 |
|  | 505 | >83 | 54.7 | 19.6 |
| 750 | 470 | >50 | 31.5 | 27.4 |
|  | 475 | >55 | 35.4 | 27.2 |
|  | 480 | >60 | 39.5 | 27.0 |
|  | 485 | >63 | 43.9 | 26.9 |
|  | 490 | >66 | 48.5 | 26.7 |
|  | 495 | >71 | 53.2 | 26.5 |
|  | 500 | >74 | 58.1 | 26.3 |

A second embodiment of the heat treatment system 300' is shown in FIG. 4B and may also be used in connection with any of the pitch production systems. Without such heat treatment, pitch may be produced in amounts of about 15-25% of initial decant oil 203. With heat treating according to the process described here for the system 300', yields can be increased by about 25-30% for totals of about 40-50% total pitch yield. If the distillates are recycled and further heat treated, total pitch yield may be increased up to about 60-80% depending on the quality levels of the starting material and the distillates.

In this embodiment of the heat treatment system 300', the components of the reactor 320' may differ slightly from those previously described, as may some of the operating parameters of the overall heat treatment system 300'. As a non-limiting example of a preliminary test design, the input material may be at temperatures of about 49-104° C., flow rates of about 7.2-13.1 MT/h and pressures of about 20-70 psi(g) when entering the heat treatment system 300'. The pressure pump 311 may be a high-pressure feed pump operating at about 2 gpm at 300 psi(g), though other rates and pressures are also contemplated. The pressure pump 311 may raise the flow rate of the input material to about 20.3 MT/h and pressure to about 200-260 psi(g) before it enters the heat exchanger 312.

The heat exchanger 312 increases the temperature of the input material to about 413-430° C. by passing hotter components, such as the heated product from downstream in the system 300' through the heat exchanger 312. From there, the material is transferred to a process heater 314 where it is further heated to temperatures of about 465-500° C. depending on the characteristics of the input material.

As in the previous embodiment, the process heater 314 may be an inductive heated or soaking coil and may be powered by any suitable source 316, such as but not limited to a transformer as shown, operating at 1 MW of power. There may be multiple connections from the source 316 to the process heater 314 and/or coils 315 therein, which may be at regular intervals such as at every three turns of the coil 315. However, any configuration is contemplated that provides sufficient power to the process heater 314. The process heater 314 may have a sufficient length of coil 315 therein in which to retain and heat the input material to the desired target temperature before leaving the process heater 314 through reactor outlet line 317.

The reactor outlet line 317 is in fluid communication with a first vessel 321' of a reactor 320'. This first vessel 321' may be a plug flow reactor as previously described. The heated material enters the first vessel 321' from the bottom and rises at a near-uniform rate, avoiding turbulence and maintaining the same rate of flow for all molecules of heated material. The first vessel 321' may be under pressure at about 100-200 psi(g), preferably in the range of 100-175 psi(g), and is further under inert gas 318, such as nitrogen or argon gas, to limit the oxygen present in the first vessel 321' in view of the high temperatures. The heated material may preferably be at about 482.2-496° C. when it enters the first vessel 321'. As it travels up the length of the first vessel 321', it may lose some heat, such as about 20-30° C.

In embodiments, the first vessel 321' may include a disengagement zone 328 defined along a portion thereof, preferably near the top of the vessel 321'. The disengagement zone 328 has a larger diameter, and thus internal volume, than the remainder of the first vessel 321'. In embodiments, this additional space may allow vapors including small hydrocarbon molecules that failed to form pitch 150, 250 in the pitch production processes to separate from the liquid and be removed as LC1 322'. This extraction may also limit foaming, which is undesirable as creating turbulent flow. These LC1 322' rise to the top of the first vessel 321'. The LC1 322' may be at temperatures of about 437.8-443.3° C. and removed from the first vessel 321' at a point preferably above the disengagement zone 328. The removed LC1 322' may be routed to a condenser where they are condensed and/or thermally destroyed in a pollution control device.

LC2 333 may form in the disengagement zone 328 as foam and/or vapors. The LC2 333 contain non-condensable gasses and may be removed from the disengagement zone 328 of the first vessel 321' and transferred to a second vessel 324'. In a preferred embodiment, additional light chains LC2 333 enter the second vessel 324' at a mid-point there along. The liquid heated material from the first vessel 321' is also transferred to the second vessel 324' through an interim reactor line 323' as the level of heated material in the first vessel 321' rises to a certain level. The heated material from the first vessel 321' is combined with the LC2 333 in the second vessel 324' for additional plug flow through the second vessel 324'. The second vessel 324' is also under inert gas 318, which may be the same or different from that of the first vessel 321'. The heated material is at substantially the same temperature and pressure in the second vessel 324' as in the first vessel 321', though there may be some loss as the heated material travels through the reactor 320'.

The vapors collecting in the top of the second vessel 324' may be removed as light chains LC3 340, which may be subsequently combined with the LC1 322' and condensed back to liquid. These combined LC1 322' and LC3 340 may contain naphtha, which may be purified and separated at a naphtha refinery for sale or further use. The remainder of the LC1 322' and LC3 340 may be thermally destroyed as discussed above. The bottom of the second vessel 324' contains the heat-treated material which is then sent back to the heat exchanger 312 through reactor output line 325 for cooling. Once cooled, the heat-treated material returns to the pitch production system 100, 100', 100'', 200, 200', 200'' depending on the embodiment and type of system, with similar intersection points as identified above. Alternatively, the heat-treated material may proceed from the reactor 320' back to column C1 or may be temperature reduced as through conventional means.

The residence time for the heat treatment process using the second embodiment of the system 300' varies depending at least on the temperatures used. For instance, heated coal tar material at temperatures of about 482.2-500° C. may be passed through the heat treatment process 200' for a retention time of about 10-20 minutes, whereas temperatures of about 537.8° C. may only sustain a retention time of about 5 minutes. Retention times of up to 60 minutes are possible with lower reaction temperatures. These are just a few non-limiting examples.

Subjecting input material to the heat treatment system 300' of the present invention for one pass has been shown to increase pitch yields by 2.5 times, producing about 40% overall pitch yield as compared to about 15% pitch yield with no heat treatment. Additional pitch 150, 250 may be further generated by recycling the input material through the heat treatment system 300' at least once, if not multiple times, though there is a risk that mesophase buildup will occur with increased pitch load. Therefore, in some embodiments it may be beneficial or even necessary to pass the heat treated product through distillation to remove resulting pitch 150, 250 so it is not recycled back through the heat treatment system 300' again. This will limit or prevent the production of mesophase in the pitch 150, 250.

In contrast to the coal tar 102 starting material, decant oil 203 has a higher degree of variability in composition and concentrations thereof between batches. This leads to additional complexity in terms of the relationship between the temperature, retention time and pressure. However, desired pitch parameters of >47% coking value and <0.7% mesophase control the outer limits of acceptable pitch yield increase since increases too high or too low produce pitch with either insufficient coking values or too much mesophase. Because of these limits, the relationship between retention time and temperature in heat treating decant oil can be described in the following equations:

$$25 = 0.1((1.8 \times T_r + 32) - T_c) + 0.1(R_t)$$

where 25 is the percent yield increase to be obtained over what can be obtained without heat treating (as determined by the desired pitch parameters of at least 47% coking value and no more than 0.7% mesophase); $T_r$ is reaction temperature in Celsius; $T_c$ is 653 and $R_t$ is retention time in minutes. The first 0.1 indicates the percent yield increase for each degree Fahrenheit increased in temperature, and the second 0.1 indicates the percent yield increase with each additional minute. Depending on the constraints of a particular system, the above equation may be expressed in terms of retention time $R_t$ or reaction temperature $T_r$, respectively, as:

$$R_t = 250 - (1.8 \times T_r + 32) + T_c$$

$$T_r = \frac{(250 - R_t + T_c) - 32}{1.8}$$

In the preferred embodiments discussed herein, the $T_r$ reaction temperature may be in the range of 454-483° C. and the $R_t$ retention times in the range of 3-25 minutes when heat treating decant oil 203. Interestingly, a 25% yield increase, corresponding to the "25" and "250" in the equations above, applies equally well for decant oil 203 starting material with −5 to 0 API gravity. Yield increases above or below this tend to produce either unacceptable levels of mesophase or insufficient coking values. As is commonly understood in the petroleum industry, API gravity relates to specific gravity (SP) as follows:

$$API = \frac{141.5}{SG}$$

Therefore, though the specific gravity of the decant oil 203 in petroleum pitch production 200" may change the operative parameters of the system 200", the above equation applies equally well for various specific gravities of the decant oil 203 starting material.

The above formula for predicting the reaction temperatures and reaction times given above provides the following exemplary ranges of operative parameters of the heat treatment process of petroleum distillates using the heat treatment system 300' disclosed herein for average reactor gradient, shown in Table 8:

TABLE 8

| Reaction Temp (min) | Temp (° C.) | Pitch Yield (wt %) | Coking Value (wt %) | Total Mesophase |
|---|---|---|---|---|
| 1 | 496 | 54 | 47.3 | 0.9 |
| 2.5 | 482 | 47.5 | 49.4 | 0.6 |
| 5 | 482 | 53.7 | 49.2 | 0.4 |
| 10 | 482 | 54.3 | 50.5 | 0.5 |
| 10 | 468 | 43 | 47.3 | 0.1 |
| 10 | 477 | 53.7 | 48.0 | 0.2 |
| 20 | 459 | 44.7 | 47.7 | 0.6 |
| 20 | 460 | 43.8 | 49.4 | 0.3 |
| 20 | 463 | 46.4 | 47.8 | 0.6 |
| 20 | 459 | 47.5 | 50.1 | 0.5 |
| 20 | 468 | 40.0 | 47.6 | 0.0 |
| 20 | 471 | 40.0 | 50.0 | 0.7 |

These and other features of the preferred embodiments of the invention may be further illustrated through the following non-limiting examples.

EXAMPLES

The following Examples provide experimental data derived in determining and/or testing certain parameters of the pitch production systems and/or heat treatment systems described herein. Reference to particular embodiments are provided as appropriate.

Example 1

Determining Rate of Heavy Distillate Removal

Certain experiments were performed to determine a maximum flow rate at which heavy distillate 141 may be removed from the third column C3 of the first embodiment of coal tar pitch production system 100 discussed above without impairing the overall performance of the pitch production system 100. Heavy distillate 141 heat treatment is important for the separation of B(a)P as well as to maintain a higher softening points in the resulting pitch 150, such as about 130° C. Mettler.

Given a goal of increasing pitch yield by 5%, the flow rate required for heat treatment system 300 was calculated as follows. Assuming annual tar throughput is about 300,000 MT/year, 5% of this figure is about 15,000 MT/year, which would be additional pitch required. This rate of 15,000 MT/year divided by an estimated yield of 30% is about 50,000 MT/year, divided by 300 days/year in operation provides 166 MT/day or 7 MT/h for flow rate through the heat treatment system 300 to achieve the additional 5% pitch yield.

The coal tar pitch production system 100 typically may be operated at rates of about 31.5 MT/h for pitch production, Running the heavy distillate 141 through the heat treatment process 300 at a rate of about 7 MT/h would require an equivalent drop in rate for the pitch production. Tests were therefore conducted to determine if sufficient decreases in pitch production rates to achieve the added pitch yield could be made without impeding the existing pitch production process.

To test this, a trial simulated a heat treatment draw of heavy distillate 141 by partially closing the valve to its distillate line 142 from the third column C3 by various amounts. This restricted the flow rate, as a draw of oil would do. Four different valve positions were tested, having various different percentages of closure, starting with 55% closed (the normal operation), then 35% closed, 30% and 25% closed. For each valve position, the flow rate was measured to monitor the amount of simulated draw of heavy distillate 141. The heat duty was also measured to monitor the effect of the system and the softening point (Mettler) of the resulting pitch was measured as quality control for the pitch production process. Other items were also measured as controls. For better understanding the impact the separation, B(a)P and distillation interval was also measured. The results of these trials are summarized in Table 9 below.

TABLE 9

| | | | | |
|---|---|---|---|---|
| Flow meter valve closure [%] | 55 | 35 | 30 | 25 |
| Heavy distillate flow rate [MT/H] | 31.5 | | 18.8 | 10.8 |
| Heavy distillate product rate | 6.5 | 6.5 | 6.3 | 6.5 |
| E3 heat duty [MW] | 1.32 | 1.20 | 1.09 | 0.70 |
| Heavy distillate zone cooling [MW] | 104 | 0.85 | 0.72 | 0.27 |
| Heavy distillate tray temp [° C.] | 279.4 | 288.2 | 293.7 | 301.4 |
| Flash pressure [mbara] | 112.5 | 116.7 | 114.4 | 112.6 |

TABLE 9-continued

| | | | | |
|---|---|---|---|---|
| 2nd Medium distillate tray temp [° C.] | 207.3 | 211.7 | 214.8 | 220.8 |
| 2nd Medium distillate valve (control) | 100 (cold) | 100 (cold) | 100 (cold) | 100 (cold) |
| Top pressure [mbar(a)] | 73.5 | 74.2 | 75.9 | 78.0 |
| 1st Medium distillate yield [—] | 6.9 | 7.2 | 8.4 | 10.0 |
| Heavy distillate tray level [%] | 80.52 | 77.74 | 78.48 | 70.42 |
| Est. Mettler [° C.] | 128.0 | 130.3 | 127.8 | 127.7 |
| B(a)P [ppm] | — | — | 3.69 | 3.95 |
| Dist. interval [0-300° C.] | — | — | 1 | 1 |
| Dist. interval [0-355° C.] | — | — | 76 | 68 |

The results show that the heavy distillate 141 heat treatment flow rate can be reduced while maintaining normal operation of the pitch production system 100. This is demonstrated by the effect the flow rate reduction has on the heat duty. The process condition at 55% show some of the normal variations even though it the standard operation conditions. This can be seen from the second medium distillate tray temp which differs from its normal temperature at 210° C.

Even though normal operation was maintained, it should be noted that the second medium distillate cooling loop was maxed out. This let the second medium distillate tray temp increase as the experiment progressed, which led to an increase in the first medium distillate yield. Having the second medium distillate cooling reach a maximum is problematic, especially when additional cooling duty is removed with a reduction in the heavy distillate flow rate.

In general, both the temperature control and the lab results indicate that the column is cooled insufficiently. When additional flow is removed from the control loop this effect increases. Therefore, additional cooling may be needed to overcome the loss in cooling duty or to reduce the energy input.

Together, these results demonstrate that for a heat treatment process using a flow rate of 7 MT/h is possible, but additional cooling may be required for low PAH creosote production.

Example 2

Determining Reactor Temperatures

To further design full-scale application of the heat treatment systems 300, some base cases were evaluated, specifically the process heater 314 temperature. Here, temperatures of 420, 445, 471, 497 and 522° C. were evaluated. The lower limit for this evaluation was based on preliminary autoclave results which showed limited reactivity. The upper limit was based on the autoignition temperature of heavy distillate, which have been measured to 542° C. For safety reasons the final reactor temperature has limited to 522° C.

Previous experiments have shown that heavy distillate can be subjected to temperatures of 550° C. for 5.2 min without forming mesophase or coke. In addition, previous experiments on long retention times provided the following data, shown in Table 10.

TABLE 10

| Temperature (° C.) | Retention time (hr) | Yield % (softening point 115° C.) |
|---|---|---|
| 395 | 4 | 15.7 |
| 401 | 2 | 10.6 |
| 420 | 5 | 26.7 |

Based on these previous data, kinetic-based simulations were determined incorporating use of a heavy distillate flow rate of 7 MT/h and desired 30% pitch yield overall as identified from Example 1. These kinetic calculations provide the following data, shown in Table 11.

TABLE 11

| Outlet reactor temp | 420 | 445 | 471 | 497 | 522 |
|---|---|---|---|---|---|
| Reactor vol [m³] | 17.9 | 8.2 | 3.71 | 1.74 | 0.82 |
| Retention time [min] | 142.7 | 64.3 | 28.6 | 13.1 | 6.1 |
| Input energy required [kW] | 360 | 374 | 376 | 391 | 383 |

The maximum retention time used in the lab is 5.2 min. As can be seen from Table 11, most of the calculated results far exceed this time. Therefore, these kinetic calculations may over-estimate the reaction rates.

Example 3

Testing Various Temperatures and Retention Times Coal Tar

Test runs were performed to assess the feasibility of heat treating heavy distillate to convert it to pitch. These initial experiments were performed at various temperatures between 365 and 510° C. and retention times ranging from 4.5 minutes to 2 hours. A reaction constant was derived from these results. Two additional experiments were performed adiabatically to measure whether the reaction is endothermic, thoroughly insulating the reactor to ensure that the measured temperature of the reactor was not due to the temperature of the oven, but instead of the heavy distillate inside. The experiments were performed using a plug flow reactor.

Experiments were all performed in the same general manner. Heavy distillate was placed in a feed tank and pumped through the reactor by a rotational pump. The reactor is housed in an oven with a pre-heater, and different sized reactors were also used ranging from 299-330 mL in size. The heavy distillate was pumped through the reactor to obtain a predetermined retention time at a given temperature. After the oven, the heavy distillate goes through a cooling coil to lower the temperature before going into either a waste tank or a sample tank. Once the temperature of the reactor was stable, sample collection was conducted. 1000 grams of sample were collected for most experiments.

Heat tracing was added to all pipes to ensure that the heavy distillate was liquid throughout the experiments. The feed tank was kept at 100° C., the cooling coil at 180° C. and the sample and waste tanks were kept at 150° C. Temperature sensors were placed at multiple places on the pre-heater and reactor to follow the temperature profile of the heavy distillate. A nitrogen purge flow was used to have an inert atmosphere during the experiments. The experiments were performed at elevated pressure to overcome the vapor pressure of the heavy distillate. Experiments were generally run around 100 psi(g).

The resulting heat-treated oil needed to be distilled to find the pitch yield for that sample. A vacuum distillation was set up for the distillations. Each distillation was performed with approximately 400 grams of sample in a round bottomed flask. The distillation column used was 1 m long Vigreux column. All samples were distilled under full vacuum. The bottom temperature was set to 250° C. in the beginning of the distillation and then gradually increased until enough oil had been distilled off to produce the expected yield. If the pitch was not within the right melting point range of 105-430° C., another distillation was remade from scratch. During the second distillation the bottom temperature was increased or decreased to make sure either more or less distillate would distill off, to produce a pitch with a higher or lower melting point, respectively.

Several analyses were performed on the heat-treated oil, the pitch and the distillate. The heat-treated oil was measured on Fourier-transform infrared spectroscopy (FTIR) to calculate the aromaticity. The melting point of the pitch was measured and should be between 105-130° C. to be accepted. QI of the pitch is measured and was desired to be as low as possible. The pitch was also analyzed for B(a)P. Gas chromatography (GC) was performed on the distillate to calculate the conversion of the compounds in the heavy distillate and to calculate the reaction constant. Some of the oil was also measured using gas chromatography mass spectroscopy (GCMS) to compare with the GC results.

The data of the various tests are summarized in Table 12 below.

TABLE 12

| Experiment | F18024 | F18025 | F18027 | F18028 | F18029 | F18031 | F18032 | F18033 | F18034 |
|---|---|---|---|---|---|---|---|---|---|
| Pitch Yield % | 13.83 | 16.55 | 38.31 | 37.23 | 23.94 | 17.79 | 30.45 | 45.24 | 55.01 |
| Mettler [° C.] | 103.35 | 126.35 | 125.8 | 119.7 | 128.85 | 116.9 | 119.25 | 121.85 | 118.8 |
| QI % | 0.1 | 0.08 | 0.11 | 0.00 | 0.513 | 0.22 | 0.84 | 0.2 | 0.31 |
| Corrected Pitch yield | 11.34 | 18.97 | 40.62 | 38.23 | 26.90 | 18.20 | 31.36 | 46.70 | 55.82 |
| Reactor volume [ml] | 205.89 | 205.89 | 205.89 | 139.52 | 139.52 | 139.52 | 205.89 | 205.89 | 205.89 |
| Avg Temperature [° C.] | 479.2 | 501.5 | 539.8 | 538.0 | 521.8 | 499.7 | 519.8 | 551.2 | 562.7 |
| Retention time [min] | 4.7 | 4.5 | 4.4 | 2.9 | 3.0 | 3.1 | 4.5 | 4.2 | 4.1 |

| Experiment | F19008 | F19012 | F19015 | F19016 |
|---|---|---|---|---|
| Pitch Yield % | 27.6 | 24.54 | 19.13 | 30.42 |
| Mettler [° C.] | 111.35 | 129.85 | 119.9 | 118.7 |
| QI % | | 0.19 | 0 | |
| Corrected Pitch yield | 26.82 | 27.71 | 20.18 | 31.21 |
| Reactor volume [ml] | 67 | 327.0 | 326.7 | 326.7 |
| Avg Temperature [° C.] | 528 | 465.2 | 488.8 | 514.4 |
| Retention time [min] | 1.78 | 37.8 | 8.6 | 8.2 |

These data show an increase in pitch yield percentages over the tested temperatures and retention times, indicating the heat treatment of heavy distillate can increase pitch yield.

The results of the adiabatic experiments to test whether the reaction is endothermic are shown in Table 13 below.

TABLE 13

| Experiment | F19020 | F19021 |
|---|---|---|
| Reactor inlet [° C.] | 482 | 499.8 |
| Reactor middle [° C.] | 483 | 499.8 |
| Reactor outlet [° C.] | 483.75 | 500.8 |

Example 4

Testing Various Temperatures and Retention Times—Petroleum

Various lab scale tests were performed at various temperatures and retention times for heat treating petroleum derived decant oil. Raw decant oil was subjected to heat soaking in an autoclave at constant 200 psi(g). A slight lag time was experienced as the decant oil was heated to the desired temperature. Once subjected to the desired temperature for the specified time, the heat-treated product was quickly cooled to quench the heat soaking and limit mesophase formation. The pitch formed during the heat treatment process was isolated by distillation to remove any unreacted decant oil and the resulting pitch was characterized by coking value and mesophase. The results of these experiments are summarized in Table 14 below.

TABLE 14

| Time at Temp (min) | Lag Time (min) | Treating Time min) | Temp (° C.) | Pitch Yield (wt %) | Coking Value (wt %) | Total Mesophase |
|---|---|---|---|---|---|---|
| 0 | 1 | 1 | 496 | 54 | 47.3 | 0.9 |
| 2.5 | 2 | 4.5 | 482 | 47.5 | 49.4 | 0.6 |

TABLE 14-continued

| Time at Temp (min) | Lag Time (min) | Treating Time min) | Temp (° C.) | Pitch Yield (wt %) | Coking Value (wt %) | Total Mesophase |
|---|---|---|---|---|---|---|
| 5 | 2 | 7 | 482 | 53.7 | 49.2 | 0.4 |
| 10 | 2 | 12 | 482 | 54.3 | 50.5 | 0.5 |
| 10 | 2 | 12 | 468 | 43 | 47.3 | 0.1 |
| 10 | 2 | 12 | 477 | 53.7 | 48.0 | 0.2 |
| 20 | 5 | 25 | 459 | 44.7 | 47.7 | 0.6 |
| 20 | 5 | 25 | 460 | 43.8 | 49.4 | 0.3 |
| 20 | 2 | 22 | 463 | 46.4 | 47.8 | 0.6 |
| 20 | 5 | 25 | 459 | 47.5 | 50.1 | 0.5 |

Each of the above experiments produced acceptable pitch that was characterized by >47% coking value and <0.7% mesophase.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described.

What is claimed is:

1. A heat treating system for the derivation of pitch from a starting material selected from the group consisting of: (i) petroleum-based decant oil and (ii) coal tar-based heavy distillate oil, the heat treating system comprising:
a pump;
a conduit in fluid communication with said pump, said conduit at least partially constructed of conductive material facilitating heat transfer and at least one component section having:
a lower first end,
a fluid input proximate to said lower first end in fluid communication with said pump,
an upper second end,
a vapor phase output proximate to said upper second end,
a generally vertical intermediate portion between said first and second ends, and
a fluid output intermediate said fluid input and said vapor phase output and within said generally vertical intermediate portion, defining a vapor space within said conduit between said fluid output and said upper second end and a fluid space between said fluid output and said lower first end;
said heat conductive portion of said conduit having a maximum temperature of 459-535° C.; and
said generally vertical intermediate portion of said conduit having a maximum pressure of 46-300 psi(g); and being sized and shaped such that said pump maintains a continuous and near-uniform upward flow of said fluid input material at a near-constant temperature within said fluid space for a period of time sufficient to convert at least a portion of said starting material to pitch while limiting mesophase formation to no more than 0.7% in a combined stream to obtain a pitch yield: (i) of at least 25% with respect to said petroleum-based decant oil and (ii) at least 15% with respect to said coal tar-based heavy distillate oil.

2. The heat treating system of claim 1, wherein said intermediate portion of said conduit further comprises a reactor section.

3. The heat treating system of claim 1, wherein said heat conductive section further comprises a heating section.

4. The heat treating system of claim 3, wherein said heating section is inductively heated.

5. The heat treating system of claim 3, wherein said heating section is an elongated coiled conduit.

6. The heat treating system of claim 1, wherein at least a portion of said conduit is sized to induce turbulent flow of said starting material therethrough.

7. The heat treating system of claim 2, wherein said reactor section further comprises at least one retention vessel for maintaining said starting material at a near-constant temperature.

8. The heat treating system of claim 2, wherein said reactor section further comprises at least one retention vessel for maintaining near-uniform flow of said starting material therethrough.

9. The heat treating system of claim 2, wherein said reactor section further comprises a plurality of vessels.

10. The heat treating system of claim 2, wherein said reactor section further comprises at least one vessel of elongated, cylindrical shape.

11. The heat treating system of claim 2, wherein said reactor section further comprises an inert atmosphere.

12. The heat treating system of claim 1, further comprising a heat exchanger for exchanging thermal energy from said combined stream to said starting material prior to introduction to said conduit.

13. The heat treating system of claim 9, wherein said plurality of vessels further comprises a first and second vessel and said first vessel is sized with a larger capacity than said second vessel.

14. The heat treating system of claim 13, wherein said second vessel is minimally sized.

15. The heat treating system of claim 8, wherein said vessel is elongated and has a length to diameter ratio of 10:1 or greater.

16. The heat treating system of claim 1 wherein said near-constant temperature is within the range of plus or minus 30° C.

17. The heat treating system of claim 15, wherein said near-constant temperature is within the range of plus or minus 10° C.

18. The heat treating system of claim 15, wherein said near-constant temperature is plus or minus 5° C.

19. A distillation system for the derivation of pitch having no more than 0.7% mesophase content from petroleum-based decant oil to obtain an increase in pitch yield of at least 25%, said distillation system comprising:
the heat treating system of claim 1 for receiving and treating said petroleum-based decant oil to derive pitch therefrom; and
at least one distillation column in fluid communication with said heat treating system for receiving and fractioning said heat treated petroleum-based decant oil into component fractions including pitch.

20. The distillation system of claim 19 further comprising a plurality of distillation columns.

21. The distillation system of claim 20, wherein at least one of said distillation columns further comprises a flash distillation.

22. The distillation system of claim 19, wherein said decant oil is recirculated to said heat treatment system subsequent to the removal of said pitch in said distillation column.

23. A distillation system for the derivation of pitch having no more than 0.7% mesophase content from coal tar-based heavy distillate oil to obtain a pitch yield of at least 15%, said distillation system comprising:

at least one distillation column for receiving and fractioning coal tar into component fractions including pitch and coal tar-based heavy distillate oil; and the heat treating system of claim 1 in fluid communication with said at least one distillation column system for receiving and treating said coal tar-based heavy distillate oil to derive pitch therefrom.

24. The distillation system of claim 23 further comprising a plurality of distillation columns.

25. The distillation system of claim 24, wherein at least one of said distillation columns further comprises a flash distillation.

26. The distillation system of claim 24, wherein at least one of said distillation columns further comprises a dehydrator.

27. The distillation system of claim 23, wherein said coal tar-based heavy distillate oil is recirculated to said heat treatment system subsequent to the removal of said pitch in said distillation column.

* * * * *